United States Patent [19]

Fuchigami et al.

[11] Patent Number: 5,331,872
[45] Date of Patent: Jul. 26, 1994

[54] MARK CUTTING APPARATUS AND METHOD OF CONTROLLING SAME

[75] Inventors: Shinichi Fuchigami, Fussa; Shingi Suzuki; Takeshi Kongo, both of Hachioji; Tetsuo Nakada, Sagamihara; Takehiro Kodama, Hino; Sachie Sato, Machida, all of Japan

[73] Assignee: Kabushiki Kaisha Tokyo Horaisha, Tokyo, Japan

[21] Appl. No.: 769,802

[22] Filed: Oct. 2, 1991

[51] Int. Cl.⁵ ............................................. B26D 7/10
[52] U.S. Cl. ...................................... 83/171; 83/563; 83/582
[58] Field of Search ............... 83/171, 76.9, 563, 564, 83/582, 881, 602, 528, 879, 936, 939, 699, 700, 575; 219/221; 346/139 R

[56] References Cited

U.S. PATENT DOCUMENTS

| | | | |
|---|---|---|---|
| 3,555,950 | 1/1971 | Gijsbers et al. | 83/171 |
| 4,732,069 | 3/1988 | Wood et al. | 83/881 |
| 4,854,205 | 8/1989 | Anderka | 83/881 X |
| 4,934,236 | 6/1990 | Gordon | 83/563 |
| 5,262,617 | 11/1993 | Higashiguchi | 83/575 X |

FOREIGN PATENT DOCUMENTS

| | | | |
|---|---|---|---|
| 0061173 | 2/1992 | Australia | 83/171 |
| 3313770 | 11/1984 | Fed. Rep. of Germany . | |
| 2535495 | 5/1984 | France . | |
| 2647386 | 11/1990 | France . | |
| 0252393 | 10/1989 | Japan | 83/171 |
| 2136332 | 9/1984 | United Kingdom . | |

Primary Examiner—Rinaldi I. Rada
Attorney, Agent, or Firm—Paul A. Guss

[57] ABSTRACT

Marks such as patterns, designs, numbers, or the like are cut out of a mark sheet or mark sheets placed on a glass base by a thermal cutter having a heated cutting bit. The thermal cutter is movable two-dimensionally over the mark sheet, and is also vertically movable between an upper position in which the thermal cutter is lifted off the mark sheet supported on the base and a lower position in which the thermal cutter is lowered in contact with the mark sheet supported on the base. The thermal cutter is angularly movably supported on an eccentric shaft that is rotatable by a stepping motor. The thermal cutter has a cutting bit resiliently urged by a spring for stable positioning. A range or ranges in which desired marks are to be cut out of a mark sheet or mark sheets can be confirmed by being traced by the thermal cutter before the marks are actually cut out. When mark numerals indicative of desired numbers are to be cut out, such mark numerals are rearranged and displayed for the operator's information. The thermal cutter can be cleaned by a cutter cleaner in a different cleaning pattern each time the thermal cutter has moved a predetermined distance in contact with the mark sheet or mark sheets. The thermal cutter moves to the cutter cleaner and also to a position to start cutting out desired marks, at a higher speed than the speed at which it cuts out the desired marks.

6 Claims, 27 Drawing Sheets

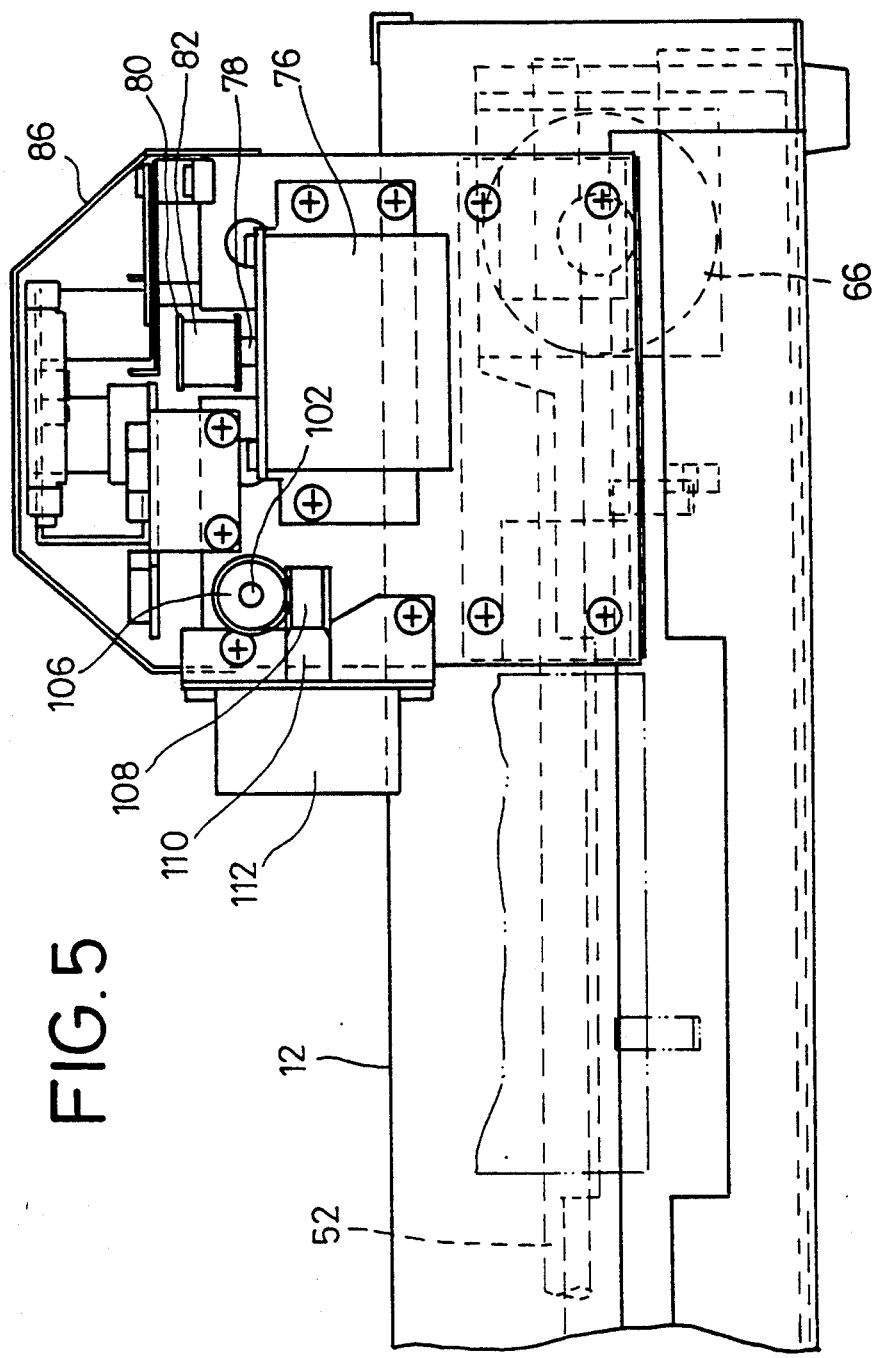

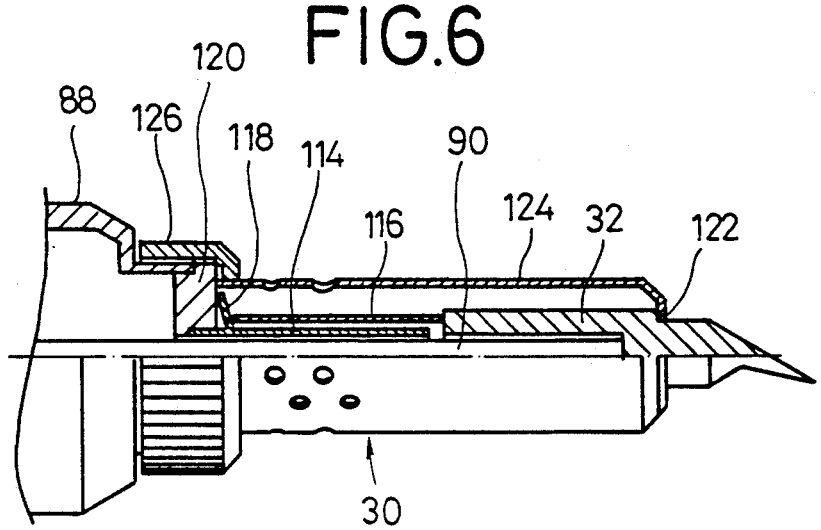
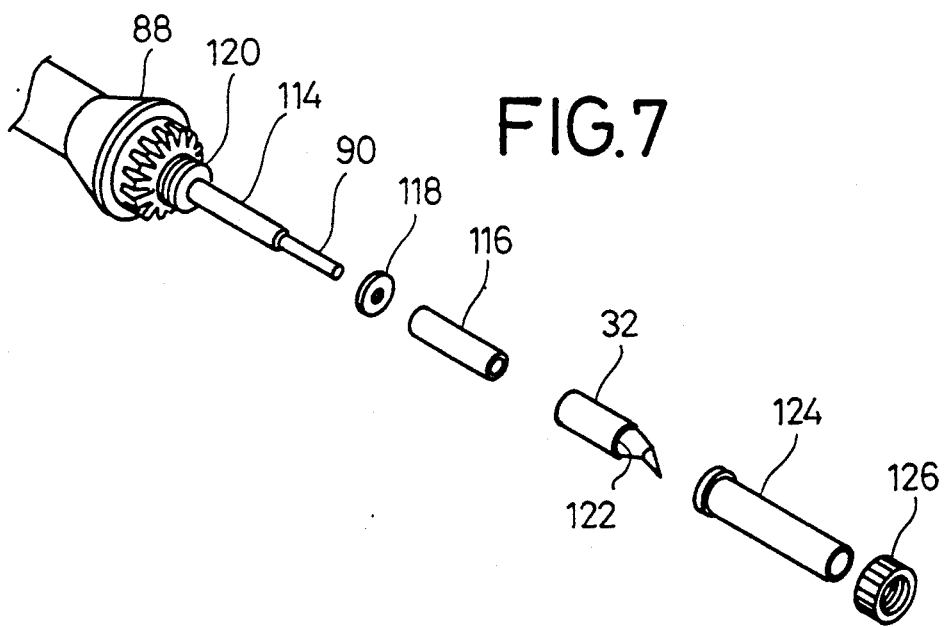

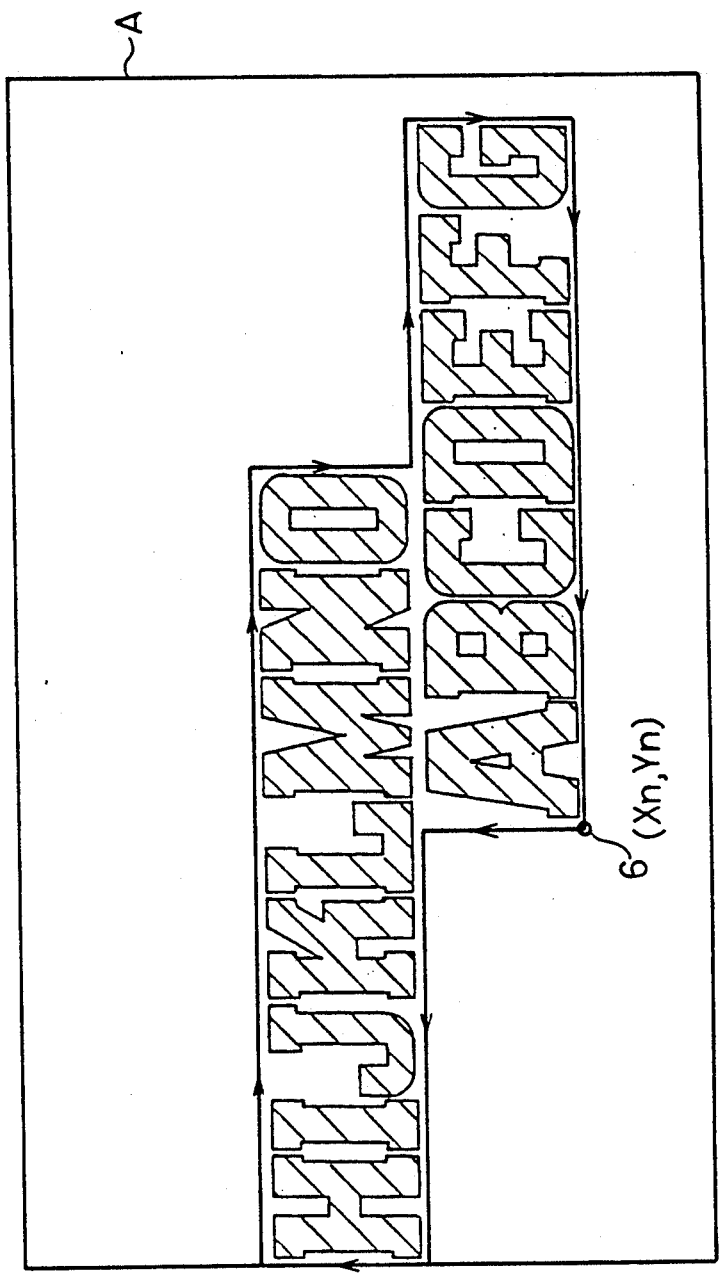

FIG. 21 buf [0][1][2][3][4][5][6][7][8][9]

FIG. 22 edbuf X→

FIG. 23 ednbuf X→

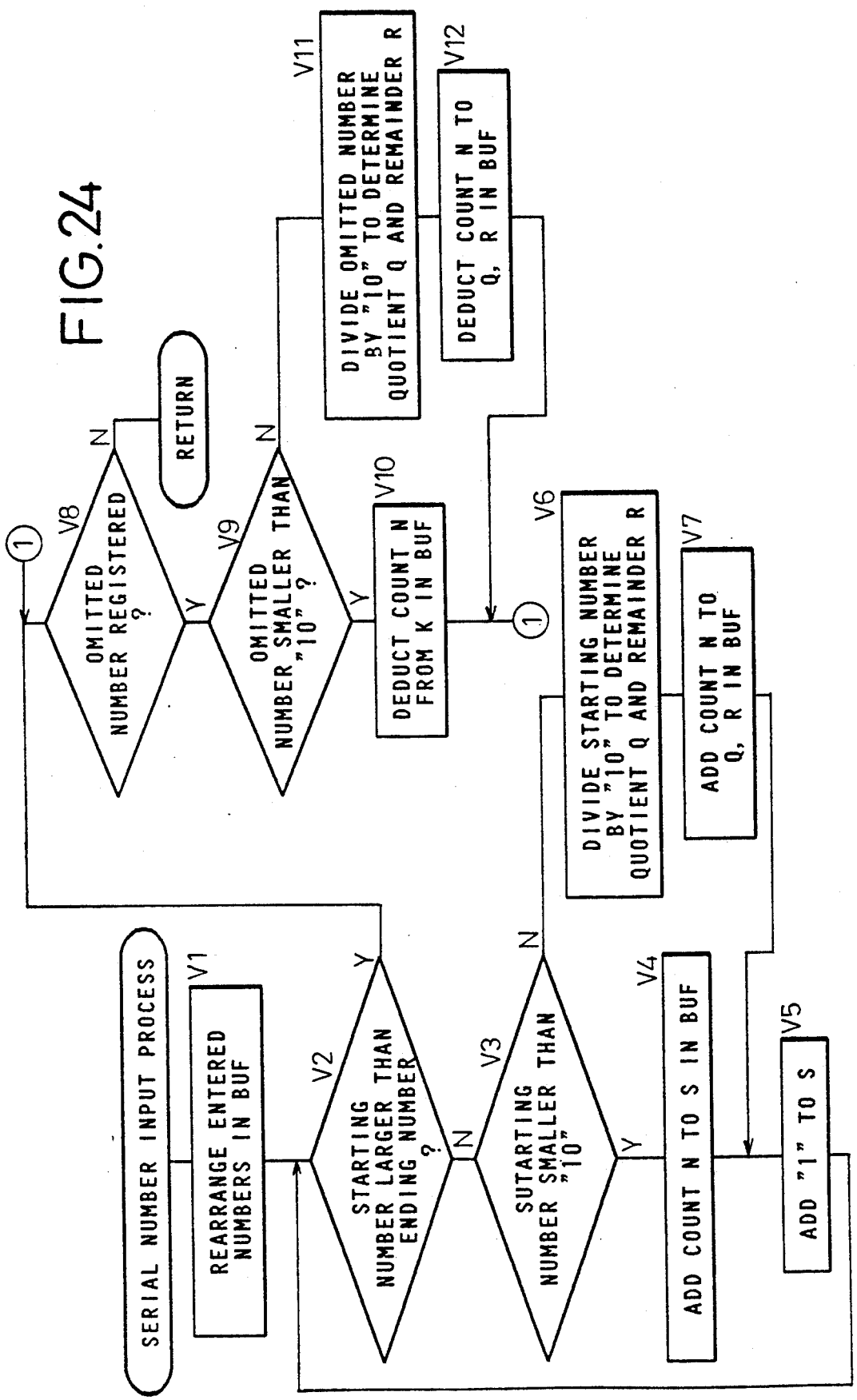

(1) CW  (2) CCW  (3) CW  (4) CCW (5) CCW (9) CW

MARK CUTTING APPARATUS AND METHOD OF CONTROLLING SAME

BACKGROUND OF THE INVENTION

1. Field of the Invention

The present invention relates to a mark cutting apparatus for cutting out marks, such as patterns, designs, numbers, or the like to be applied to uniforms, clothes, or other garments, from a mark sheet of fabric, and a method of controlling such a mark cutting apparatus.

2. Description of the Prior Art

Conventional mark cutting apparatus have a thermal cutter vertically movable by a solenoid-operated actuator between an upper position in which the thermal cutter is lifted off a mark sheet supported on a base and a lower position in which the thermal cutter is lowered in contact with the mark sheet supported on the base. When the solenoid-operated actuator is operated, it produces noise that disturbs the operator and makes the working environment worse. Since the thermal cutter is abruptly lowered into hitting engagement with the mark sheet by the solenoid-operated actuator, the cutting bit of the thermal cutter tends to be damaged in repeated use.

The thermal cutter includes a heater attached to a cutter base, and the cutting bit, which is usually made of copper, is mounted on the distal end of the heater. The cutting bit is securely attached to the cutter base by a protective pipe of stainless steel that engages the cutter base and the cutting bit. When the heater is energized to heat the cutting bit, the protective pipe and the cutting bit are subjected to large stresses due to thermal expansion. Therefore, the protective pipe tends to buckle, and the cutting bit is liable to work loose when it is repeatedly heated and cooled.

In some mark cutting apparatus, a laser beam is used to cut marks out of a mark sheet or mark sheets. In order to determine the size of marks to be cut out, the marks are illuminated by light emitted from a light-emitting device. However, the mark cutting apparatus with such a light-emitting device are relatively large in size.

Since mark patterns are cut out of a mark sheet, it has been customary to limit the size of ranges in which mark patterns are to be cut out from a mark sheet, within a certain range. It is necessary to confirm a range for selected mark patterns, and select mark patterns with respect to each mark sheet. When a number of mark patterns are selected and entered, they will have to be cut out of a plurality of mark sheets. Since the selected mark patterns are entered into the apparatus with respect to each sheet, the process of entering the selected mark patterns is complex and time-consuming, and often induces errors.

Sometimes, numerals representing a number or numbers are cut as marks out of a mark sheet. When such a number or numbers are selected and entered, ten numeric keys are operated on repeatedly. After the number or numbers have been selected and entered, they are successively displayed on a display screen. When more numbers are selected and entered, the ten numeric keys are more frequently pressed. Therefore, it has been tedious and time-consuming to select and enter many numbers.

If numbers ranging from "10" to "14" for example, are selected and entered, then mark numerals that are actually cut out of a mark sheet are made up from a combination of mark single digit numerals ranging from "0" to "9". Thus, one mark numeral "0", five mark numerals "1" one mark numeral "2" one mark numeral "3" and one mark numeral "4" are actually cut out of a mark sheet.

With the conventional mark cutting apparatus, however, the numbers ranging from "10" to "14" are simply successively displayed on the display screen. The operator cannot recognize, at a glance, the actual counts of mark numerals to be cut out of a mark sheet, and hence has difficulty confirming those counts. In addition, the operator has been unable to obtain quick basic data for an efficient process of cutting desired mark numerals' out of a mark sheet or sheets without a wasteful consumption of mark sheets.

Heretofore, the thermal cutter has been periodically cleaned based on a visual inspection by the operator. When the thermal cutter is to be cleaned, the apparatus has to be shut off, but such an apparatus shutdown results in an inefficient operation. The operator is also required to visually check the marks as they are cut out so that they are not smeared by deposits on the thermal cutter. Further, when the thermal cutter is cleaned, provisions should be taken to ensure safety due to the heat of the thermal cutter.

In the conventional mark cutting apparatus, the thermal cutter cuts out marks out of a mark sheet, moves in contact with the cutter cleaner, and moves to a position to start cutting marks out of a mark sheet, all at the same speed. The speed at which the thermal cutter moves in contact with the cutter cleaner, and also the speed at which the thermal cutter moves to the position to start cutting marks out of a mark sheet, is relatively slow, and makes the entire mark cutting process inefficient.

SUMMARY OF THE INVENTION

In view of the aforesaid problems of the conventional mark cutting apparatus, it is an object of the present invention to provide a mark cutting apparatus having a thermal cutter which is vertically movable smoothly without noise and damage to its cutting bit.

Another object of the present invention is to provide a mark cutting apparatus having a thermal cutter with its cutting bit being resiliently biased for stable retention against repeated thermally-induced dimensional changes or stresses.

Still another object of the present invention is to provide a mark cutting apparatus which allows any number of mark patterns to be entered for being cut out of a mark sheet or mark sheets, while allowing a range in which mark patterns are to be cut out of a mark sheet or sheets to be entered and confirmed before the mark patterns are actually cut out.

Yet still another object of the present invention is to provide a mark cutting apparatus which allows the counts of mark numerals, which are desired to be cut out of a mark sheet or mark sheets, to be confirmed by the operator.

Another object of the present invention is to provide a method of cutting marks out of a mark sheet or mark sheets, the method allowing the counts of mark numerals, which are desired to be cut out of a mark sheet or mark sheets, to be confirmed by the operator.

Still another object of the present invention is to provide a mark cutting apparatus which has a cutter cleaner for cleaning a thermal cutter in different cleaning patterns in respective cleaning cycles.

According to the present invention, there is provided an apparatus for cutting marks out of a mark sheet, comprising a housing having a base for supporting a mark sheet thereon, a first carriage movable in a first direction over the base, a second carriage supported on the first carriage for movement in a second direction transverse to the first direction, a thermal cutter for thermally cutting marks out of the mark sheet supported on the base, the thermal cutter being supported on the second carriage, whereby the thermal cutter can be moved over the base two-dimensionally by the first and second carriages. A mechanism is mounted on the second carriage for moving the thermal cutter in a third direction transverse to the first and second directions, between an upper position in which the thermal cutter is lifted off the mark sheet supported on the base and a lower position in which the thermal cutter is lowered in contact with the mark sheet supported on the base, the mechanism comprising a stepping motor mounted on the second carriage, an eccentric shaft rotatably mounted on the second carriage parallel to the second direction, the eccentric shaft being operatively coupled to the stepping motor whereby the eccentric shaft can be rotated by the stepping motor, a roller fitted over the eccentric shaft for sliding movement therealong, an abutment arm resting on the roller for movement therewith along the eccentric shaft, a support arm angularly movably mounted on the second carriage and coupled to the abutment arm, and an attachment fixed to the support arm and connected to the thermal cutter, and means for energizing the thermal cutter to thermally cut marks out of the mark sheet while the thermal cutter is in the lower position. The abutment arm has a pair of fingers sandwiching the roller axially therebetween, whereby the abutment arm can move with the roller along the eccentric shaft. The first carriage has a pair of opposite end walls, the eccentric shaft being supported on and extending between the end walls, the mechanism further comprising a worm wheel mounted on an end of the eccentric shaft which projects from one of the end walls, and a worm mounted on a drive shaft of the stepping motor and held in meshing engagement with the worm wheel.

According to the present invention, there is also provided an apparatus for cutting marks out of a mark sheet, comprising a housing having a base for supporting a mark sheet thereon, a first carriage movable in a first direction over the base, a second carriage supported on the first carriage for movement in a second direction transverse to the first direction, a thermal cutter for thermally cutting marks out of the mark sheet supported on the base, the thermal cutter being supported on the second carriage, whereby the thermal cutter can be moved over the base two-dimensionally by the first and second carriages. A mechanism is mounted on the second carriage for moving the thermal cutter in a third direction transverse to the first and second directions, between an upper position in which the thermal cutter is lifted off the mark sheet supported on the base and a lower position in which the thermal cutter is lowered in contact with the mark sheet supported on the base. The thermal cutter comprises a cutter base coupled to the second carriage, a heater supported by and extending from the cutter base, a cutting bit for contacting the mark sheet supported on the base, the cutting bit being detachably attached to the heater, biasing means disposed between the cutter base and the cutting bit, for normally biasing the cutting bit resiliently away from the cutter base, and a protective pipe covering the cutting bit and the biasing means and connecting the cutting bit to the cutter base, and means for energizing the thermal cutter to thermally cut marks out of the mark sheet while the thermal cutter is in the lower position. The biasing means may comprise a disc spring held against the cutter base, and a spacer disposed between the disk spring and the cutting bit. Alternatively, the biasing means may comprise a compression coil spring disposed under compression between the cutter base and the cutting bit.

According to the present invention, there is further provided an apparatus for cutting marks out of a mark sheet, comprising a housing having a base for supporting a mark sheet thereon, a thermal cutter for thermally cutting marks out of the mark sheet supported on the base, a first mechanism for moving the thermal cutter between an upper position in which the thermal cutter is lifted off the mark sheet supported on the base and a lower position in which the thermal cutter is lowered in contact with the mark sheet supported on the base, and a second mechanism for moving the thermal cutter two-dimensionally over the base. The apparatus further comprises a first storage means for storing pattern data of a plurality of mark patterns to be cut out of the mark sheet, the pattern data comprising mark pattern data indicative of the mark patterns themselves and profile data indicative of uncut areas around the mark patterns, a first key for selecting desired mark patterns from the mark patterns, a second key for confirming a range in which the selected mark patterns are to be cut out of the mark sheet, second storage means for storing a sequence of the selected mark patterns within the selected range, using the profile data of the selected mark patterns, and control means for controlling the thermal cutter to be held in an upper position and to trace the selected range in response to depression of the second key. The apparatus further includes range selecting means for selecting the range.

According to the present invention, there is also provided an apparatus for cutting marks out of a mark sheet, comprising a housing having a base for supporting a mark sheet thereon, a thermal cutter for thermally cutting marks out of the mark sheet supported on the base, a first mechanism for moving the thermal cutter between an upper position in which the thermal cutter is lifted off the mark sheet supported on the base and a lower position in which the thermal cutter is lowered in contact with the mark sheet supported on the base, and a second mechanism for moving the thermal cutter two-dimensionally over the base. The apparatus further comprises a first storage means for storing pattern data of a plurality of mark patterns to be cut out of the mark sheet, the pattern data comprising mark pattern data indicative of the mark patterns themselves and profile data indicative of uncut areas around the mark patterns, a first key for selecting desired mark patterns from the mark patterns, a second key for confirming a range in which the selected mark patterns are to be cut out of the mark sheet, second storage means for storing a sequence of the selected mark patterns within the selected range, using the profile data of the selected mark patterns. The apparatus also includes an actuating means for actuating the first and second mechanism and the thermal cutter to cut mark patterns out of the mark sheet supported on the base, and producing a signal when the mark patterns are cut fully out of the mark sheet, determining means for determining whether there are still other desired mark patterns to be cut out in response to the signal from the actuating means, and control means for controlling the actuating means to actuate the first and second mechanism and the thermal cutter to cut remaining desired mark patterns out of another sheet or sheets, if there are such remaining desired mark patterns as determined by the determining means. The apparatus further includes range selecting means for selecting the range.

According to the present invention, there is also provided an apparatus for cutting marks out of a mark sheet, comprising a housing having a base for supporting a mark sheet thereon, a thermal cutter for thermally cutting marks out of the mark sheet supported on the base, a first mechanism for moving the thermal cutter between an upper position in which the thermal cutter is lifted off the mark sheet supported on the base and a lower position in which the thermal cutter is lowered in contact with the mark sheet supported on the base, and a second mechanism for moving the thermal cutter two-dimensionally over the base. The apparatus further comprises ten numeric keys, count setting means for setting the count of desired mark numerals to be cut out of a mark sheet supported on the base, in response to operation of the ten numeric keys, serial number input means for entering serial numbers by setting starting and ending numbers in response to operation of the ten numeric keys, omitted number input means for removing undesired numbers from the entered serial numbers in response to operation of the ten numeric keys, numerical rearranging means for rearranging mark numerals, which have been entered as the desired mark numerals or as representing the serial numbers, in a sequential numerical order, display means for displaying the rearranged mark numerals, and control means for controlling the first and second mechanism and the thermal cutter to cut the mark numerals out of the mark sheet supported on the base.

According to the present invention, there is further provided a method of cutting marks out of a mark sheet, comprising the steps of setting the count of desired mark numerals to be cut out of a mark sheet supported on a base, in response to operation of ten numeric keys, entering serial numbers by setting starting and ending numbers in response to operation of the ten numeric keys, removing undesired numbers from the entered serial numbers in response to operation of the ten numeric keys, rearranging mark numerals, which have been entered as the desired mark numerals or as representing the serial numbers, in a sequential numerical order, displaying the rearranged mark numerals, and operating a thermal cutter to cut the mark numerals out of a mark sheet supported on the base.

According to the present invention, there is also provided an apparatus for cutting marks out of a mark sheet, comprising a housing having a base for supporting a mark sheet thereon, a thermal cutter for thermally cutting marks out of the mark sheet supported on the base, a first mechanism for moving the thermal cutter between an upper position in which the thermal cutter is lifted off the mark sheet supported on the base and a lower position in which the thermal cutter is lowered in contact with the mark sheet supported on the base, and a second mechanism for moving the thermal cutter two-dimensionally over the base. The apparatus further comprises a first storage means for storing a predetermined distance that the thermal cutter has moved in contact with the mark sheet supported on the base, cleaning means, disposed on the housing, for cleaning the thermal cutter in frictional contact therewith, second storage means for storing a plurality of cleaning patterns of movement of the thermal cutter with respect to the cleaning means, means for energizing the thermal cutter to thermally cut marks out of the mark sheet while the thermal cutter is in the lower position, and control means for controlling the second mechanism to move the thermal cutter in frictional contact with the cleaning means according to one of the cleaning patterns after the thermal cutter has moved the predetermined distance in contact with the mark sheet supported on the base. The cleaning means comprises a metal brush disposed on the housing on one side of the base. The control means comprises means for controlling the second mechanism to move the thermal cutter in frictional contact with the cleaning means after one of the marks has been cut out of the mark sheet, and if the thermal cutter has moved the predetermined distance while the one of the marks is being cut out of the mark sheet. The predetermined distance is selected depending on the type of the mark sheet from which the marks are to be cut out. The control means also comprises means for controlling the second mechanism to move the thermal cutter in frictional contact with the cleaning means according to another of the cleaning patterns when the apparatus is restarted after a shutdown.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a side elevational view taken along line V–V of FIG. 2;

FIG. 6 is an enlarged fragmentary cross-sectional view, partly in elevation, of a thermal cutter;

FIG. 7 is an exploded fragmentary perspective view of the thermal cutter shown in FIG. 6;

FIG. 16 is a view showing another sequence of mark patterns to be cut out of a range on a mark sheet;

Figures 21, 22, 23:
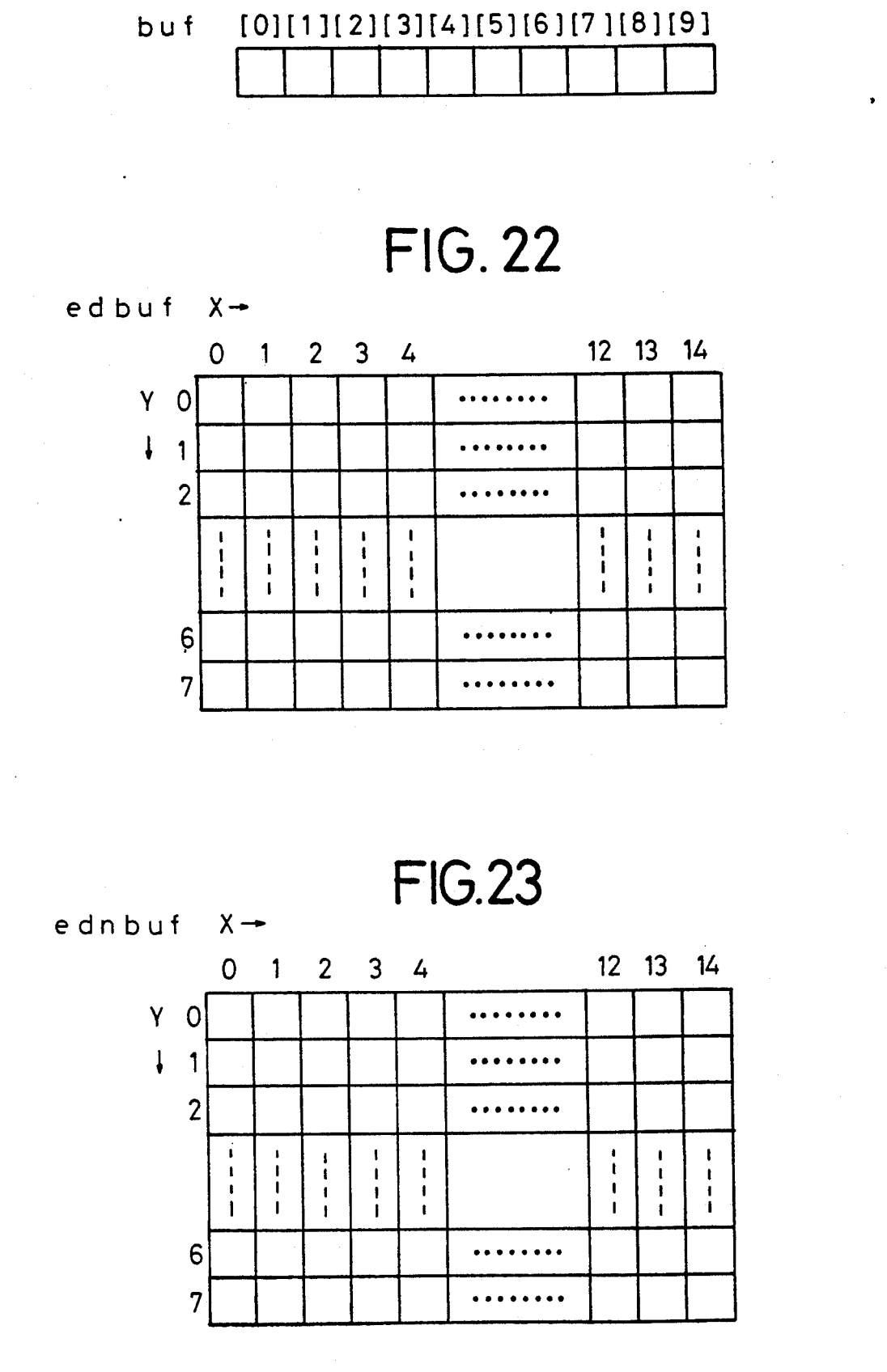

FIGS. 21 through 23 are diagrams showing memory areas of a RAM of the electric control system;

FIG. 24 is a flowchart of another subroutine of the second control process;

DETAILED DESCRIPTION OF THE PREFERRED EMBODIMENTS

Figure 1:
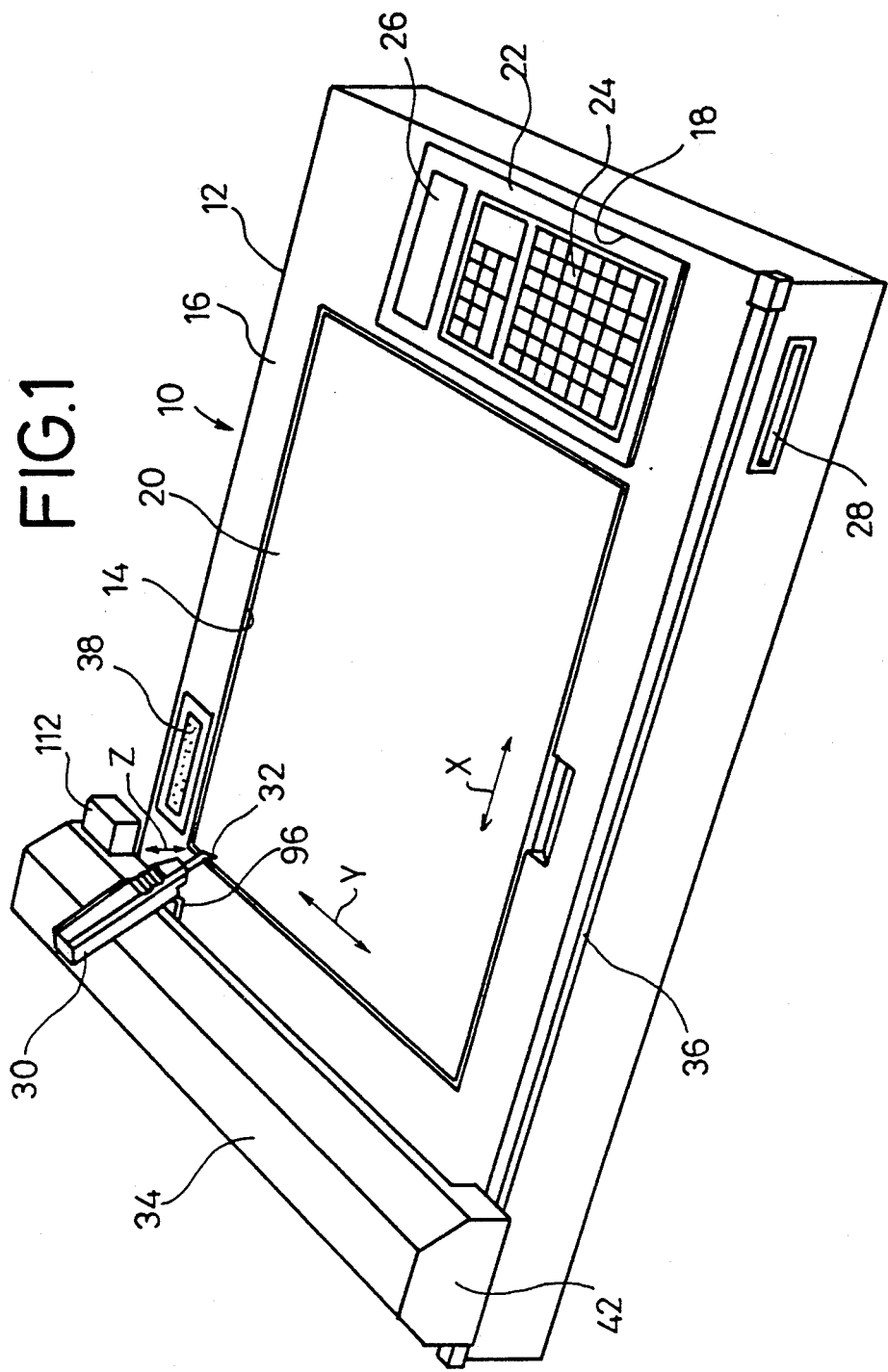
FIG. 1 is a perspective view of a mark cutting apparatus according to the present invention.

Like or corresponding parts are denoted by like or corresponding reference numerals throughout views presented in the figures.

FIG. 1 shows in perspective a mark cutting apparatus according to the present invention. As shown in FIG. 1, the mark cutting apparatus, generally designated by the reference numeral 10, comprises a housing 12 having a rectangular recess 14 defined centrally in its upper panel 16 and a smaller rectangular recess 18 defined in the upper panel laterally of the recess 14. A rectangular glass base 20 is fitted in the rectangular recess 14 for supporting thereon a mark sheet of fabric (not shown in FIG. 1), for example, from which desired marks will be cut out. The recess 18 receives a control panel 22 therein. The control panel 22 includes a key set 24 having a number of various input keys (described later on), and a display unit 26, such as a liquid crystal display. The housing 12 also has a floppy disk insertion slot 28 defined in a front panel thereof.

A thermal cutter 30 having a cutting bit 32 of copper on its lower end is movably supported on an X-axis carriage 34 that is in turn movably supported on the housing 12. As described in detail later on, the thermal cutter 30 is vertically movable in the direction indicated by the arrow Z, and also horizontally movable across the glass base 20 along the X-axis carriage 34 in the direction indicated by the arrow Y, and the X-axis carriage 34 is movable over the glass base 20 along a guide rail 36 on one edge of the upper panel 16 of the housing 12 in the direction indicated by the arrow X, the directions X, Y, Z being perpendicular to each other. Therefore, the thermal cutter 30 is two-dimensionally movable over the glass base 20 and at the same time vertically movable between upper and lower positions.

The mark cutting apparatus 10 also includes a cutter cleaner 38 which is positioned on the upper panel 16 of the housing 12 on one side of the glass base 20 remotely from the guide rail 36. The cutter cleaner 38 serves to clean the cutting bit 32, as described later on.

Figure 2:
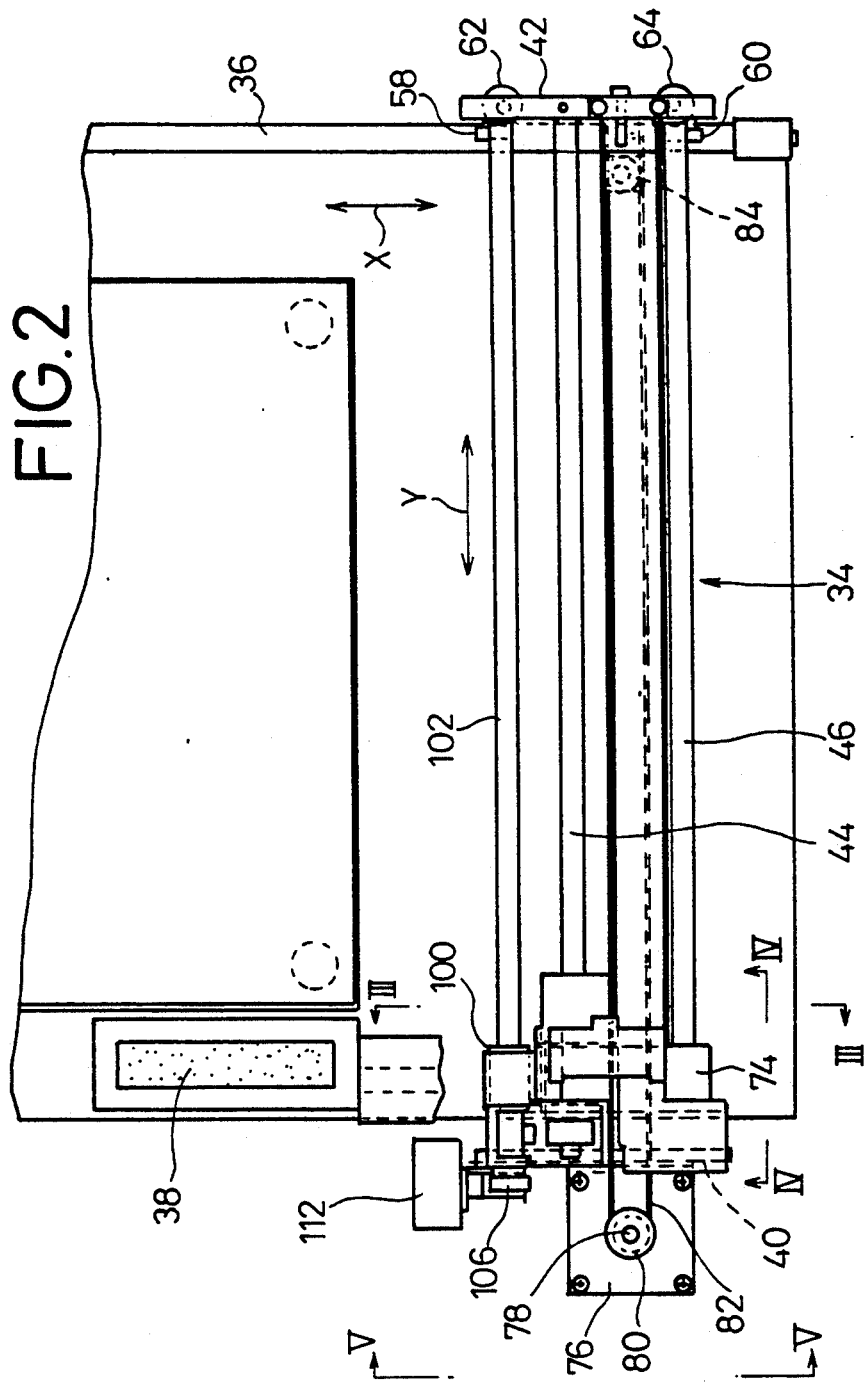
FIG. 2 is a fragmentary plan view of the mark cutting apparatus.
Figure 4:
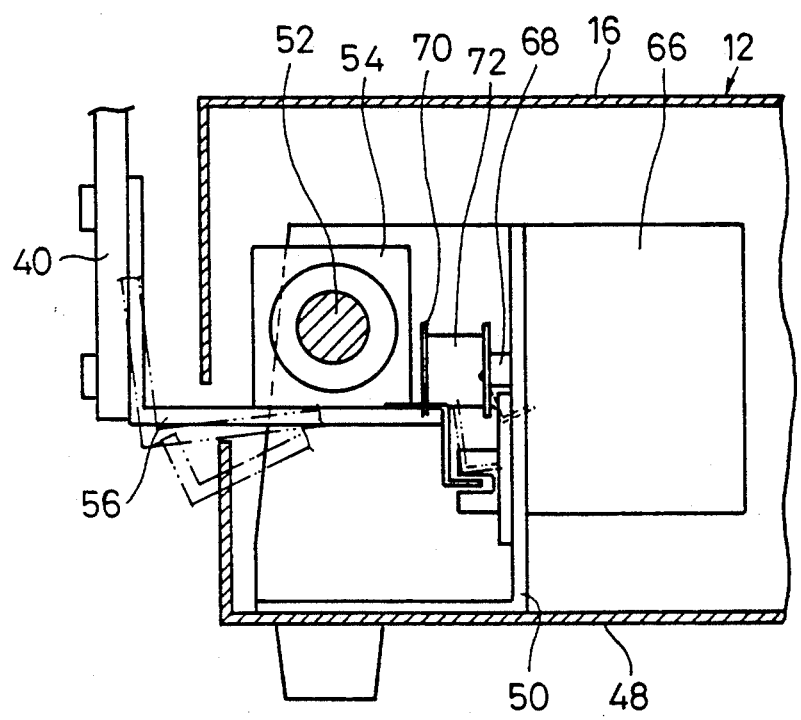
FIG. 4 is an enlarged cross-sectional view taken along line IV-IV of FIG. 2.

As shown in FIG. 2, the X-axis carriage 34 has a pair of end walls 40, 42 fixed to opposite ends of parallel shafts 44, 46 that extend parallel to the direction Y. As shown in FIG. 4, the housing 10 also includes a lower panel 48 on which there is fixedly mounted a stationary support 50 that supports a horizontal shaft 52 extending parallel to the direction X. A bearing 54 is angularly movably and axially slidably mounted on the shaft 52, and is coupled to the end wall 40 through an arm 56. As shown in FIG. 2, the end wall 42 supports a pair of vertical guide rollers 58, 60 on its upper portion and a pair of horizontal guide rollers 62, 64 on its lower portion. The vertical guide rollers 58, 60 rotatably ride on the upper surface of the guide rail 36, and the horizontal guide rollers 62, 64 are rotatably held against the outer side surface of the guide rail 36. Therefore, the X-axis carriage 34 is horizontally guided in the direction X along the shaft 52 through the bearing 54 and also along the guide rail 36 through the guide rollers 58, 60, 62, 64.

A stepping motor 66 is fixed to the stationary support 50 and has a drive shaft 68 with a pulley 70 mounted thereon. An endless belt 72 that extends along the shaft 52 is trained around the pulley 70 and another pulley (not shown) rotatably mounted in the housing 12, and is coupled to the arm 56. When the stepping motor 66 is energized, therefore, the X-axis carriage 34 is moved in the direction X along the shaft 52 and the guide rail 36 by the stepping motor 66 through the belt 72 secured to the arm 56. Since the X-axis carriage 34 is moved by the stepping motor 66 through the endless belt 72, its movement is quiet and smooth.

Figure 3:
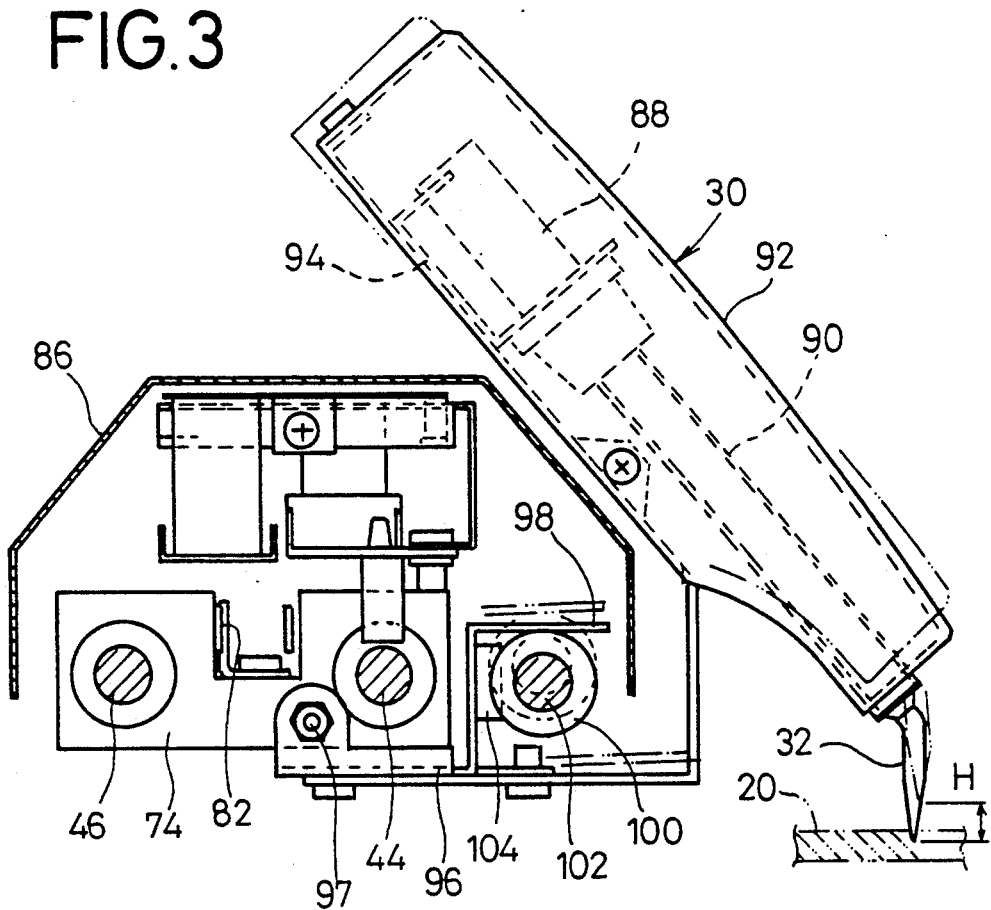
FIG. 3 is an enlarged cross-sectional view taken along line III—III of FIG. 2.

As shown in FIGS. 2 and 3, a Y-axis carriage 74 is axially movably fitted over the shafts 44, 46. A stepping motor 76 is fixed to the end wall 40 and has a drive shaft 78 with a pulley 80 mounted thereon. An endless belt 82 that extends along the shafts 44, 46 is trained around the pulley 80 and another pulley 84 rotatably supported on the end wall 42, and is coupled to the Y-axis carriage 74. Therefore, when the stepping motor 76 is energized, the Y-axis carriage 74 is moved in the direction Y along the shafts 44, 46 by the stepping motor 76 through the belt 82 secured to the Y-axis carriage 74. The Y-axis carriage 74 moves quietly and smoothly because it is driven by the stepping motor 76 through the belt 82.

As shown in FIGS. 3 and 5, the X-axis carriage 34 has a cover 86 (omitted from illustration in FIG. 2) which covers the various components on the X-axis carriage 34, including the Y-axis carriage 74.

As shown in FIG. 3, the thermal cutter 30 is obliquely positioned on one side of the cover 86 of the X-axis carriage 34. The thermal cutter 30 comprises a cutter base 88, a heater 90 coaxially extending from and supported by the cutter base 88, with the cutting bit 32 detachably attached to the heater 90, and a cover 92 surrounding the cutter base 88 and the heater 90. The cutter base 88 is fixedly mounted in the cover 92 by an attachment 94.

The attachment 94 is fixed to a support arm 96 that is angularly movably mounted on the Y-axis carriage 74 by a shaft 97. From the support arm 96, there extends upwardly an abutment arm 98 resting on a roller 100 that is rotatably and axially movably fitted over an eccentric shaft 102. The roller 100 is axially sandwiched between two fingers 104 (only one shown in FIG. 3) ireattached to the abutment arm 98.

As shown in FIG. 2, the eccentric shaft 102 is rotatably supported at its opposite ends by the end walls 40, 42. When the eccentric shaft 102 rotates about its own axis, the outer circumferential surface of the eccentric shaft 102 is displaced vertically and horizontally. A worm wheel 106 is fixed to the end of the eccentric shaft 102 which projects outwardly from the end wall 40, and is held in meshing engagement with a worm 108 mounted on a drive shaft 110 of a stepping motor 112 that is fixed to the end wall 40, as shown in FIG. 5. Accordingly, when the motor 112 is energized, the eccentric shaft 102 is rotated about its own axis, causing the roller 100, the abutment arm 98, and the support arm 96 to vertically move the thermal cutter 30 reciprocally between a lower position, indicated by the solid lines, and an upper position, indicated by the two-dot-and-dash lines, as shown in FIG. 3, the upper and lower positions being vertically spaced a distance H from each other. The height of the cutting bit 32 is determined such that the cutting bit 32 is pressed against the glass base 20 when the thermal cutter 30 is in the lower position, and is lifted off the glass base 20 when the thermal cutter 30 is in the upper position. The thermal cutter 30 vertically moves quietly and smoothly as it is angularly moved vertically by the motor 112 through the eccentric shaft 102 and the roller 100.

As shown in FIGS. 6 and 7, the cutting bit 32 is fitted over an outer end portion of the heater 90, and the heater 90 extends through a heater pipe 114 disposed in a tubular spacer 116 formed for example, from stainless steel. The tubular spacer 116 has one end held against the end of the cutting bit 32 on the heater 90 and the opposite end held against a disc spring 118 that is held against an externally threaded circular member 120 fixed to an end of the base 88. The cutting bit 32 has an annular step 122 that is engaged by a front flanged end of a protective pipe 124 formed, for example, from stainless steel, and extending over the cutting bit 32 and the tubular spacer 116. The rear flanged end of the protective pipe 124 is pressed against the externally threaded circular member 120 by a cap nut 126 that is threaded over the externally threaded circular member 120. The cutting bit 32 is resiliently urged in an axial direction away from the base 88 by the disc spring 118 that is disposed under compression between the externally threaded circular member 120 and the tubular spacer 116. The cover 92 shown in FIG. 3 is omitted from illustration in FIGS. 6 and 7.

Figure 8:
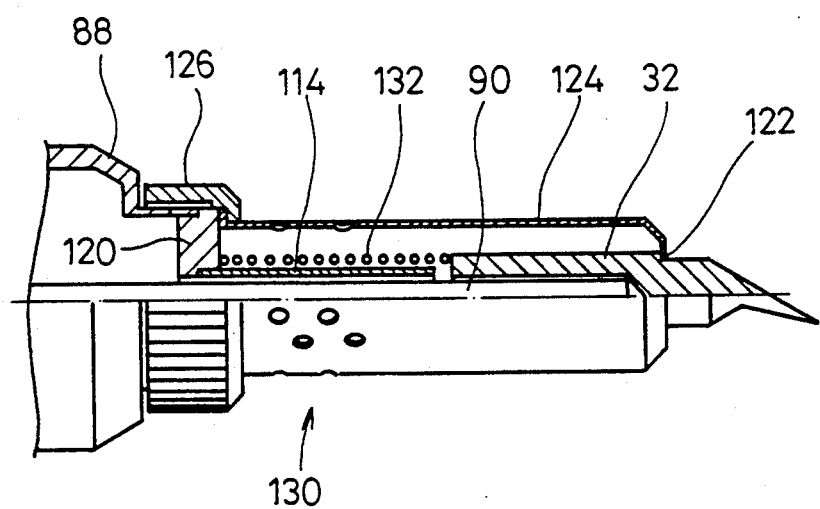
FIG. 8 is an enlarged fragmentary cross-sectional view, partly in elevation, of a modified thermal cutter.

FIG. 8 shows a modified thermal cutter 130. The thermal cutter 130 differs from the thermal cutter 30 only in that a compression coil spring 132 is axially disposed, in place of the tubular spacer 116 and the disc spring 118 (FIG. 7), under compression between the externally threaded circular member 120 and the cutting bit 32 for normally urging the cutting bit 32 away from the base 88.

In each of the thermal cutters 30, 130, the cutting bit 32 and the protective pipe 124 experience different dimensional changes and stresses because of their different coefficients of thermal expansion when the heater 90 is turned on and off repeatedly. However, since the cutting bit 32 is resiliently biased away from the base 88 at all times under resilient forces from the spring 118 or 132, the cutting bit 32 is stably held in position with respect to the protective cover 124. The thermal cutters 30, 130 are therefore highly durable in operation irrespective of repeated heating processes.

Figure 9:
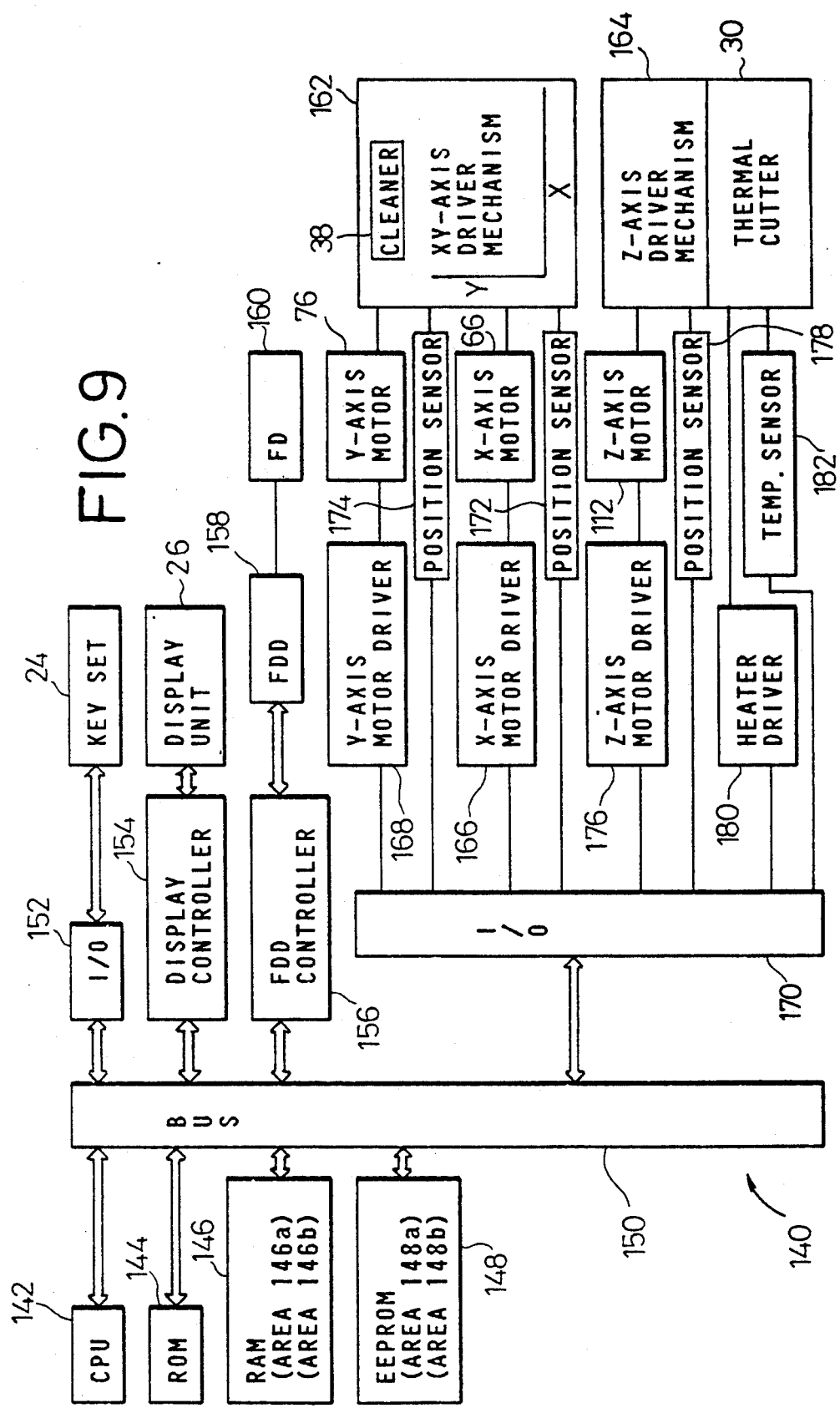
FIG. 9 is a block diagram of an electric control system for the mark cutting apparatus.

FIG. 9 shows an electric control system 140 for controlling the operation of the mark cutting apparatus 10.

The electric control system 140 includes a CPU 142 for controlling the overall operation of the mark cutting apparatus 10, a ROM 144 for storing a control program, a RAM 146 for temporarily storing various data, and a non-volatile memory or EEPROM 148 for storing various data. The CPU 142, the ROM 144, the RAM 146, and the EEPROM 148 are connected to a bus 150. To the bus 150, there are also connected an I/O interface 152 that is connected to the key set 24 (FIG. 1), a display controller 154 that is connected to the display unit 26, and an FDD controller 156 that is connected to a floppy disk drive (FDD) 158 for reading data from and recording data on a floppy disk 160 which is inserted through the floppy disk insertion slot 28.

In FIG. 9, the X-axis carriage 34, the Y-axis carriage 74, and the various mechanical components for moving the X-axis and Y-axis carriages 34, 74 in the directions X, Y in response to energization of the motors (X-axis and Y-axis motors) 66, 76 are collectively shown as an XY-axis drive mechanism 162, and the various mechanical components for vertically moving the thermal cutter 30 in the direction Z in response to energization of the motor (Z-axis motor) 112 are collectively shown as a Z-axis drive mechanism 164. The cleaner 38 is shown being included in the XY-axis drive mechanism 162.

The motors 66, 76 are electrically connected through respective motor drivers 166, 168 to an I/O interface 170 that is connected to the bus 150. The positions of the X-axis and Y-axis carriages 34, 74 in the respective directions X, Y are detected respectively by position sensors 172, 174 that are also electrically connected to the I/O interface 170. The motor 112 is electrically connected through a motor driver 176 to the I/O interface 170. The vertical position of the thermal cutter 30 in the direction Z is detected by a position sensor 178 that is also electrically connected to the I/O interface 170. The heater 90 of the thermal cutter 30 can be energized by a heater driver 180 that is electrically connected to the I/O interface 170. The temperature of the thermal cutter 30 is detected by a temperature sensor 182 that is electrically connected to the I/O interface 170.

A first process of controlling the mark cutting apparatus will be described below with reference to FIGS. 10 through FIGS. 17A and 17B. According to the first control process, desired mark patterns are cut out of a mark sheet or a plurality of mark sheets, and a range or ranges from which the desired mark patterns are to be cut out are confirmed before the desired mark patterns are cut out.

Figure 10:
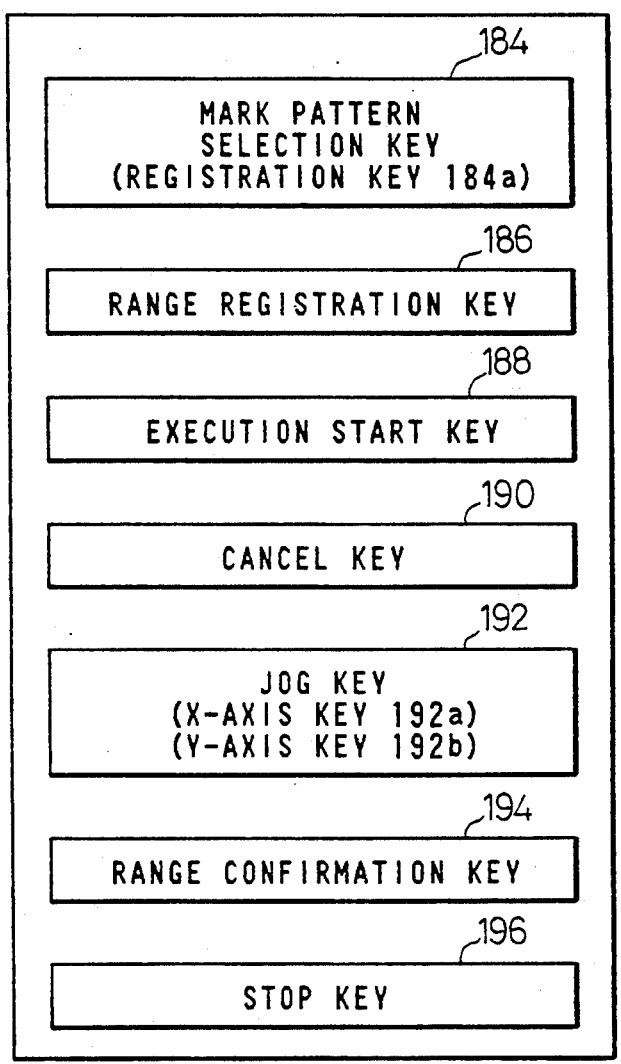
FIG. 10 is a block diagram showing keys used in a key set of the electric control system, for a first control process according to the present invention.

FIG. 10 shows a plurality of keys employed in the key set 24 (shown in FIGS. 1 and 9) for the first control process shown in FIGS. 11 through FIGS. 17A and 17B. The keys include a mark pattern selection key 184 for selecting desired mark patterns, one at a time, from the data of a plurality of mark patterns that are stored in the ROM 144 or the floppy disk (FD) 160. The mark pattern selection key 184 includes a registration key 184a. A range registration key 186, when pressed, enters a range to be cut out of a mark sheet placed on the glass base 20. An execution start key 188, when pressed, instructs the CPU 142 to start operating the mark cutting apparatus to cut the desired mark pattern out of the mark sheet. A cancel key 190, when pressed, instructs the CPU 142 to cancel various commands that have been entered. A jog key 192 is used to manually move the thermal cutter 30 to a desired position over the glass base 20. The jog key 192 includes an X-axis key 192a for moving the thermal cutter 30 in the direction X and a Y-axis key 192b for moving the thermal cutter 30 in the direction Y. A range confirmation key 194 serves to confirm a range that has been entered by the range registration key 186. A stop key 196 is used to stop the operation of the mark cutting apparatus.

The above various operations of the keys are controlled by the control program that is stored in the ROM 144 shown in FIG. 9.

Figure 12:
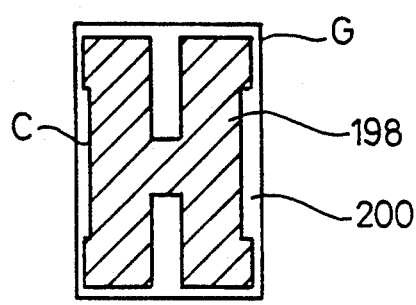
FIG. 12 is a view showing a mark pattern to be cut out and an uncut area to be left around the mark pattern.

Each item of the mark pattern data stored in the ROM 144 or the FD 160 comprises, as shown in FIG. 12, pattern data C indicative of a mark pattern 198 to be cut out by the cutting bit 32, and profile data G indicative of an uncut area 200 to be left between the mark pattern 198 and an adjacent mark pattern that is to be cut out next to the mark pattern 198.

The RAM 146 shown in FIG. 9 includes an area 146a for storing the mark pattern data of mark patterns that have been selected by the mark pattern selection key 184 and read from the ROM 144 or the FD 160.

Figure 13:
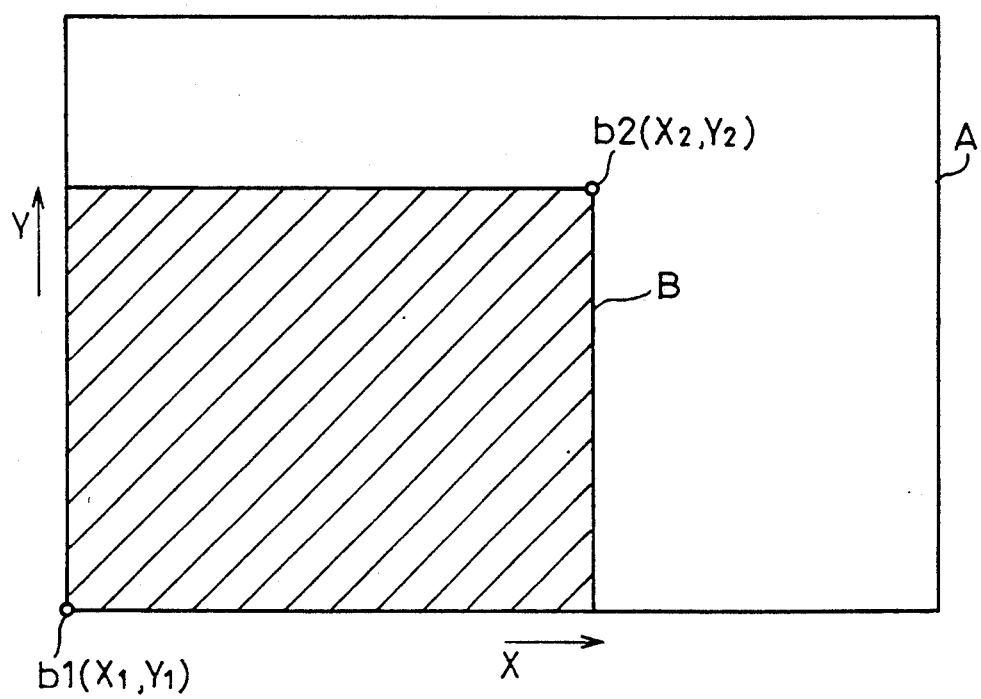
FIG. 13 is a view showing fixed and variable ranges to be set on a mark sheet.

The EEPROM 148 shown in FIG. 9 has an area 148a for storing a predetermined maximum fixed range A (see FIG. 13) that can be established on a mark sheet on the glass base 20, and an area 148b for storing a variable rectangular range B (see FIG. 13) that can be preset by the range registration key 186 and from which desired mark patterns are to be cut out. The variable range B is selected and set as follows: First, a range registration mode is selected by the range registration key 186. Then, as shown in FIG. 13, the X-axis key 192a and the Y-axis key 192b are pressed to move the thermal cutter 30 until the cutting bit 32 is registered first with a point b1 (X1, Y1) on one corner of the range B within the fixed range A and then with a point b2 (X2, Y2) on another corner of the range B that is diagonally opposite to the point b1. Each time the cutting bit 32 is registered with the point b1 and then the point b2, the range registration key 186 is pressed to cause the position sensors 172, 174 to read the coordinates (X1, Y1 and X2, Y2) of the points b1, b2 into the EEPROM 148. The range B is thus stored in the EEPROM 148.

The range B that has been selected is confirmed using the range confirmation key 194. If no variable range B is selected and stored in the EEPROM 148, then the predetermined maximum fixed range A is set from which desired mark patterns are to be cut out.

Figure 14:
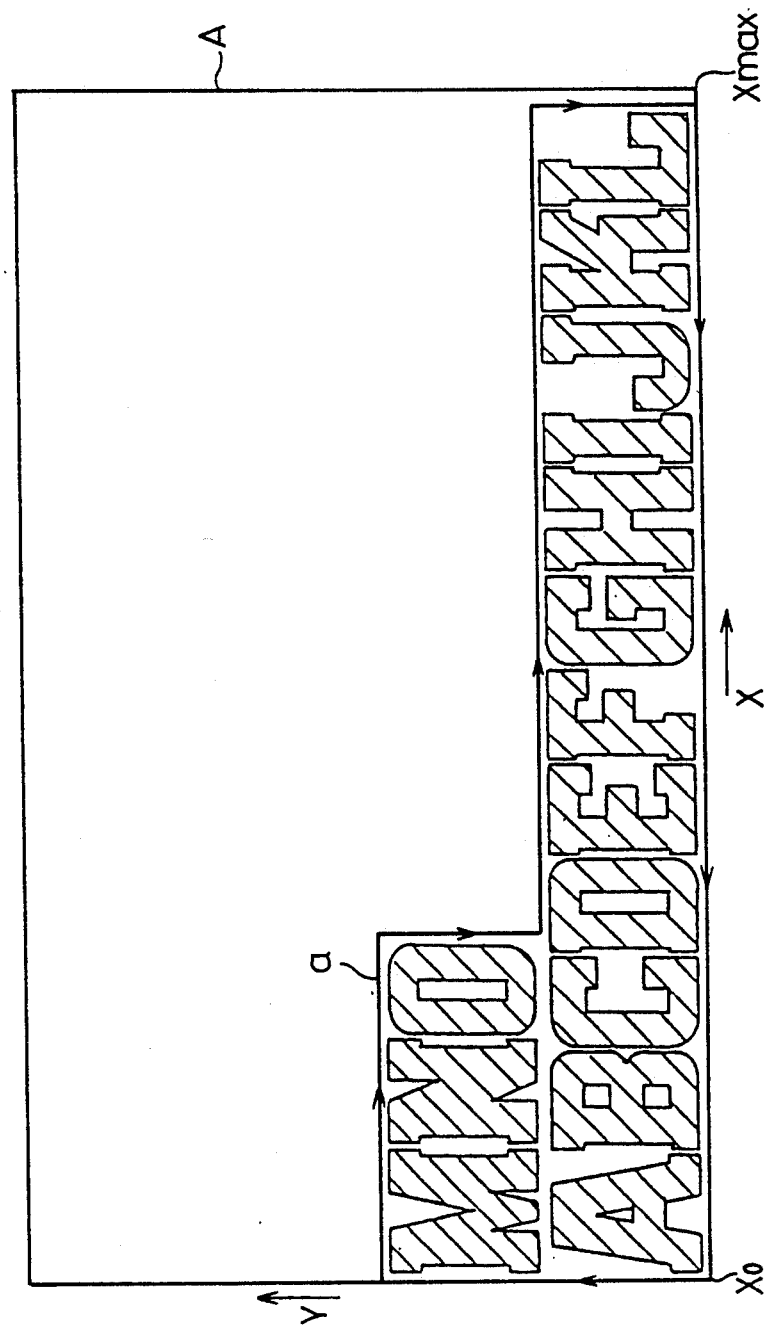
FIG. 14 is a view illustrative of a sequence of mark patterns to be cut out of a range on a mark sheet.

The RAM 146 also has another area 146b for storing a sequence of mark patterns. More specifically, as shown in FIG. 14, it is assumed here that no variable range B is selected and only a fixed range A is available. Either one of the sides X, Y of the fixed range A is used as a reference line (the side X is used as a reference line in this embodiment). Using the profile data, the mark pattern data of selected mark patterns are successively arranged in one row from a start point Xo to a point Xmax along the reference line X. When the point Xmax is reached, the mark pattern data are successively arranged in a next row from the point Xmax. Then, the range from which the mark patterns are to be cut out is established using the thermal cutter 30 which is moved clockwise along the line a by the X-axis key 192a and the Y-axis key 192b, and is confirmed by the range confirmation key 194.

When the selected mark patterns exceed a fixed range A0 (FIG. 15) for one mark sheet, then the excess mark patterns are successively arranged in a next fixed range A1 for another mark sheet, and also in a next fixed range A2 for still another mark sheet.

The first control process will now be described in specific detail with reference to FIG. 11. When the power supply of the apparatus is turned on, the heater driver 180 energizes the heater 90 of the thermal cutter 30. Then, the XY-axis drive mechanism 162 and the Z-axis drive mechanism 164 are initialized to move the thermal cutter 30 to a retracted position outside the glass base 20 in a step S1, so that a mark sheet can be placed on the glass base 20.

Figure 15:
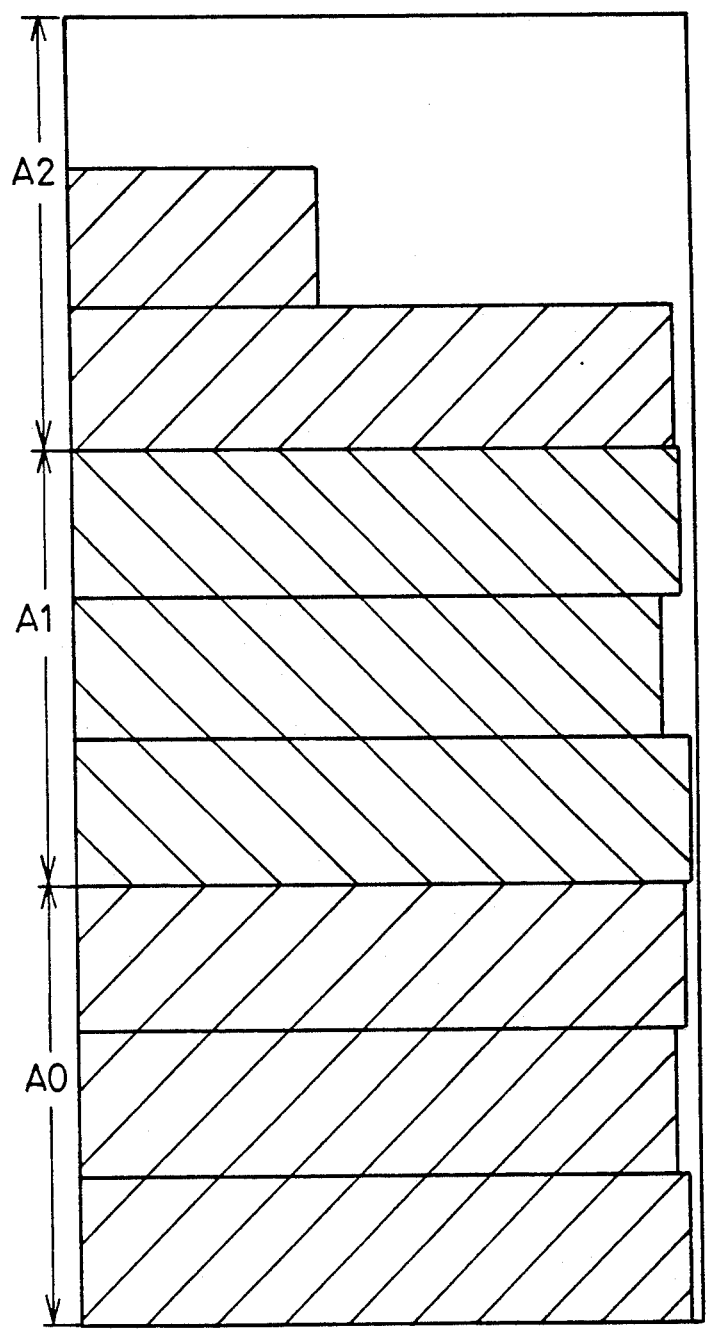
FIG. 15 is a view showing sequences of mark patterns to be cut out of a plurality of mark sheets.

The mark pattern selection key 184 is pressed to select desired mark patterns in a step S2. It is assumed that mark patterns which are to be cut out of a plurality of mark sheets are selected as shown in FIG. 15.

Then, the registration key 184a of the mark pattern selection key 184 is pressed to read the mark pattern data from the ROM 144 or the FD 160 into the area 146a of the RAM 146, and to display the selected mark pattern data on the display unit 26, in a step S3.

A step S4 determines whether a variable range B has been selected or not. If the range registration key 186 is pressed within a predetermined period of time after the registration key 184a has been pressed, then it is determined that the variable range B has been selected, and the range B is set in a step S5. If the range registration key 186 is not pressed, then a fixed range A that is a predetermined maximum range for the mark cutting apparatus is set in a step S6.

Then, a sequence of the selected mark patterns within the preset range is determined using the profile data of the mark pattern data, and is stored in the area 146b of the RAM 146 in a step S7.

A step S8 determines whether the range confirmation key 194 is pressed or not. If pressed, then control goes to a step S13. If not, then the mark sheet is fixedly placed on the glass base 20 in a step S9. A key is pressed in a next step S10, and is determined in a step S11.

If the execution start key 188 is pressed in the step S11, then the cutting data C of the mark pattern data are successively read from the RAM 146, and the motors 66, 76 are energized in a step S12. Based on the cutting data C, the thermal cutter 30 is first moved to a cutting start point of a first mark pattern, and the motor 112 is energized to lower the thermal cutter 30 until the cutting bit 32 reaches the lower position in which it abuts against the mark sheet on the glass base 20. Then, the thermal cutter 30 is moved in the directions X, Y by the motors 66, 76 to start cutting out the mark pattern until the mark pattern is fully cut out of mark sheet. Each time one mark pattern is finished, a step S14 determines whether all the mark patterns are cut out of the mark sheet on the glass base 20. If not, then the thermal cutter 30 continuously cuts off the remaining mark patterns from the mark sheet according to the sequence stored in the RAM 146.

If all the mark patterns have been cut out of the mark sheet on the glass base 20 in the step S14, then control goes to a step S15 which determines whether all the mark patterns selected and stored in the RAM 146 have been finished or not. If finished, control goes back to the step S2.

If not finished, then control proceeds to a step S16 in which a message "REPLACE WITH NEXT MARK SHEET" is displayed on the display unit 26. Since the selected mark patterns extend over a plurality of mark sheets in this embodiment, control goes to the step S16. Then, control returns to the step S4 which determines whether a variable range B is selected for the next mark sheet. If the next mark sheet is smaller than the glass base 20, then the range registration key 186 is pressed to register a variable range B, and the mark patterns are successively cut out of the mark sheet. If the next mark sheet is of the same size as the glass base 20, then the mark patterns are successively cut out of the mark sheet.

If the range confirmation key 194 is determined in the step S11, then control jumps to the step S13 in which a range confirmation mode is started. In the step S13, range data, which are a collection of the profile data G of the selected mark pattern data, are read from the area 146a of the RAM 146. With the cutting bit 32 lifted off the mark sheet, the thermal cutter 30 is moved by the motors 66, 76 based on the range data to enable the cutting bit 32 to trace the range from which the mark patterns are to be cut out.

A next step S17 determines whether all the selected mark patterns in the mark sheet have been confirmed or not. If not confirmed, then control goes back to the step S13 for continuously confirming the selected mark patterns.

If all the selected mark patterns on the mark sheet have been confirmed, then a message "MARK PATTERNS ON NEXT MARK SHEET TO BE CONFIRMED?" is displayed in a step S18. A key is pressed in a next step S19, and is determined in a step S20.

If the execution start key 188 is pressed, then control jumps from the step S20 to the step S12 in which the mark patterns are cut out of the mark sheet. If the range confirmation key 194 is pressed, then control goes from the step S20 back to the step S4 to set a range on the next mark sheet from which the mark patterns are to be cut out. Using the profile data of the remaining mark patterns, a sequence of the remaining mark patterns in the set range on the next mark sheet is determined and stored in the RAM 146 in the step S7.

Since the range confirmation key 194 has been pressed in the step S8 at this time, control jumps from the step S8 to the step S13 for confirming the range on the next mark sheet.

In FIG. 14, the range on the mark sheet is shown as being confirmed from the start point Xo thereon, i.e., the retracted position for the thermal cutter 30. However, if the thermal cutter 30 is positioned at a point (Xn, Yn) other than the start point Xo, as shown in FIG. 16, the range on the mark sheet is confirmed starting from that point (Xn, Yn).

A modification of the first control process will be described below with reference to FIGS. 17A and 17B. According to the modified first control process, when the stop key 196 is pressed while mark patterns are being cut out of a mark sheet, the range from which the remaining mark patterns are to be cut out can be confirmed.

Figure 11:
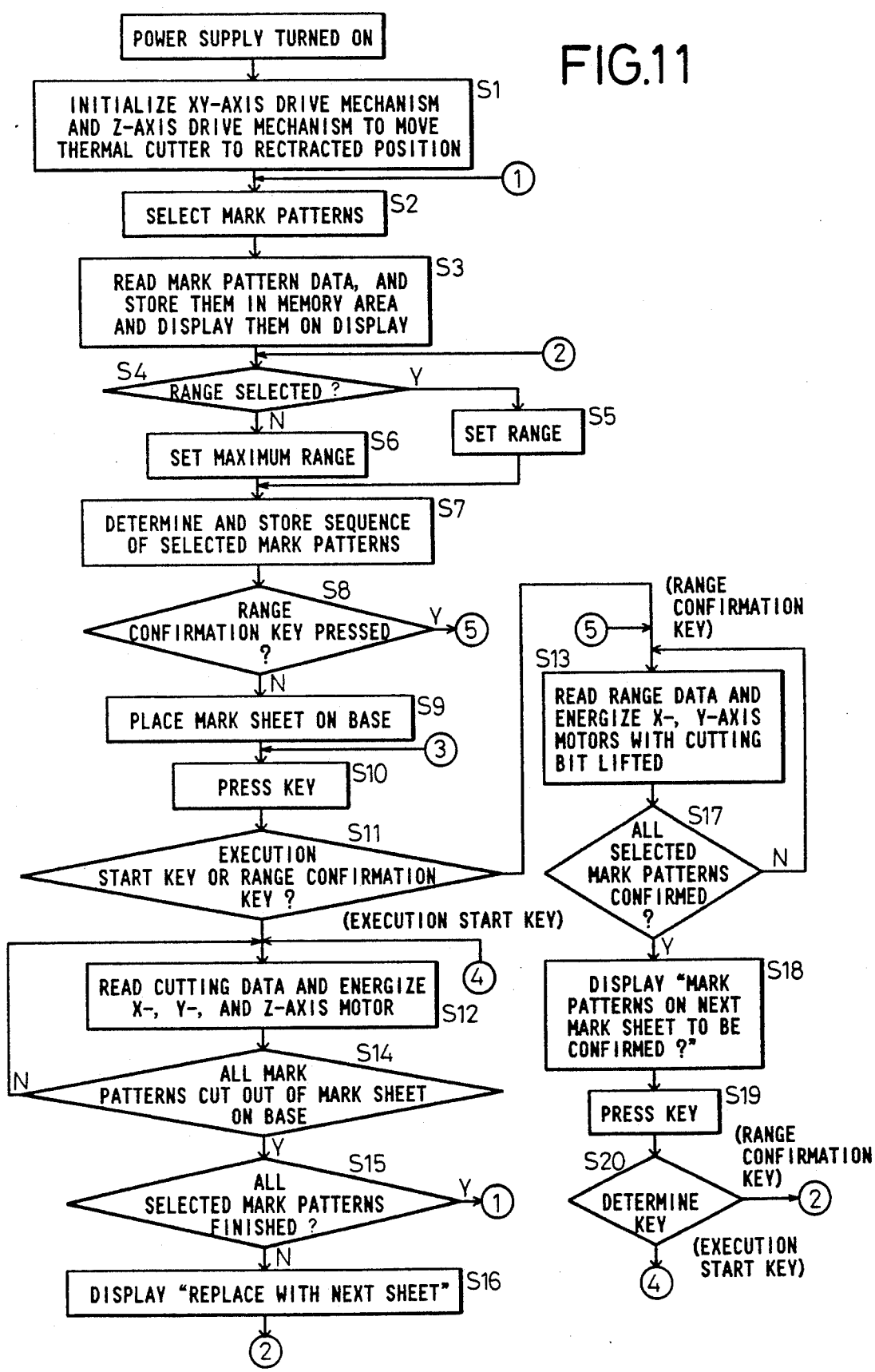
FIG. 11 is a flowchart of the first control process.
Figure 17A:
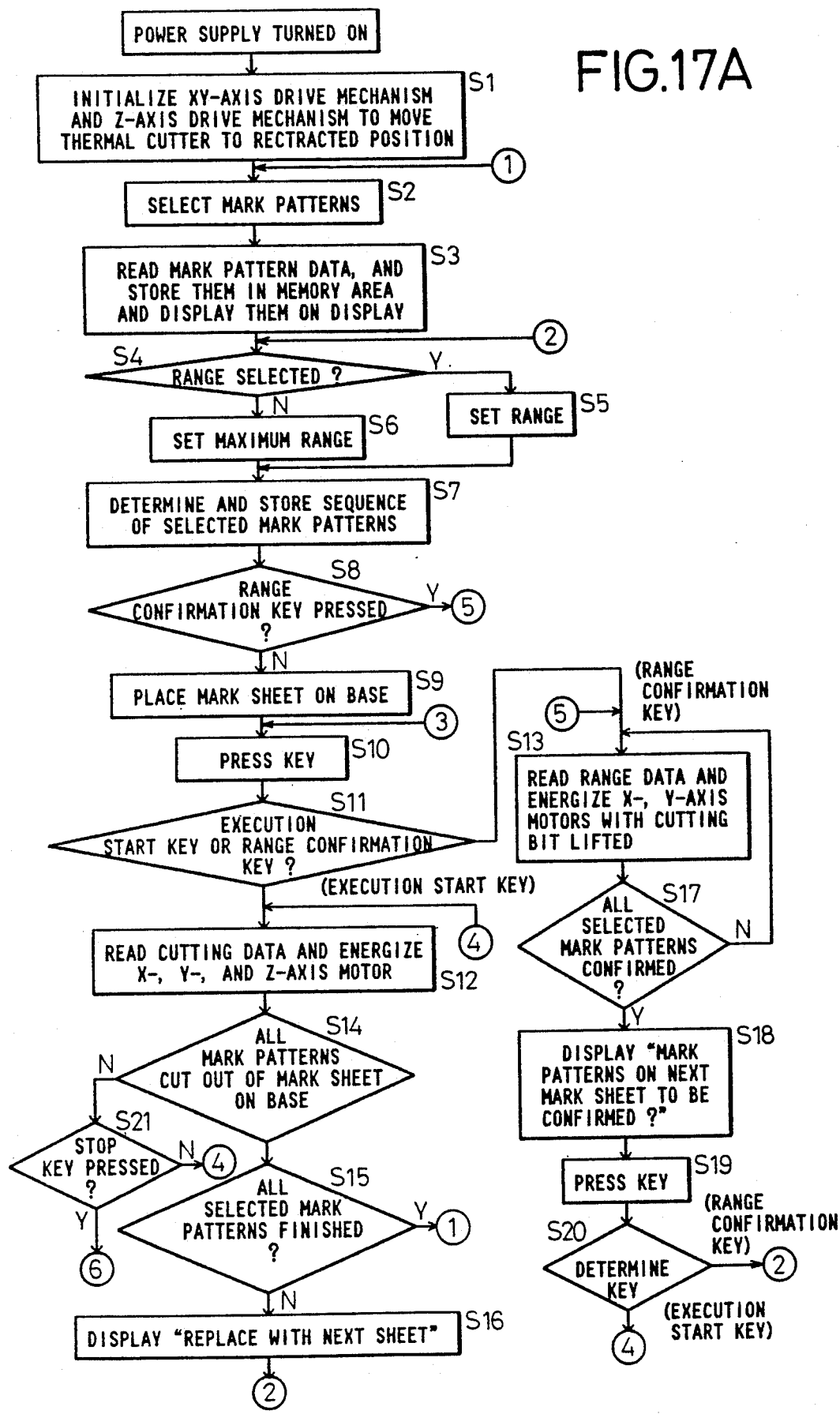
FIGS. 17A and 17B are a flowchart of a modified first control process.
Figure 17B:
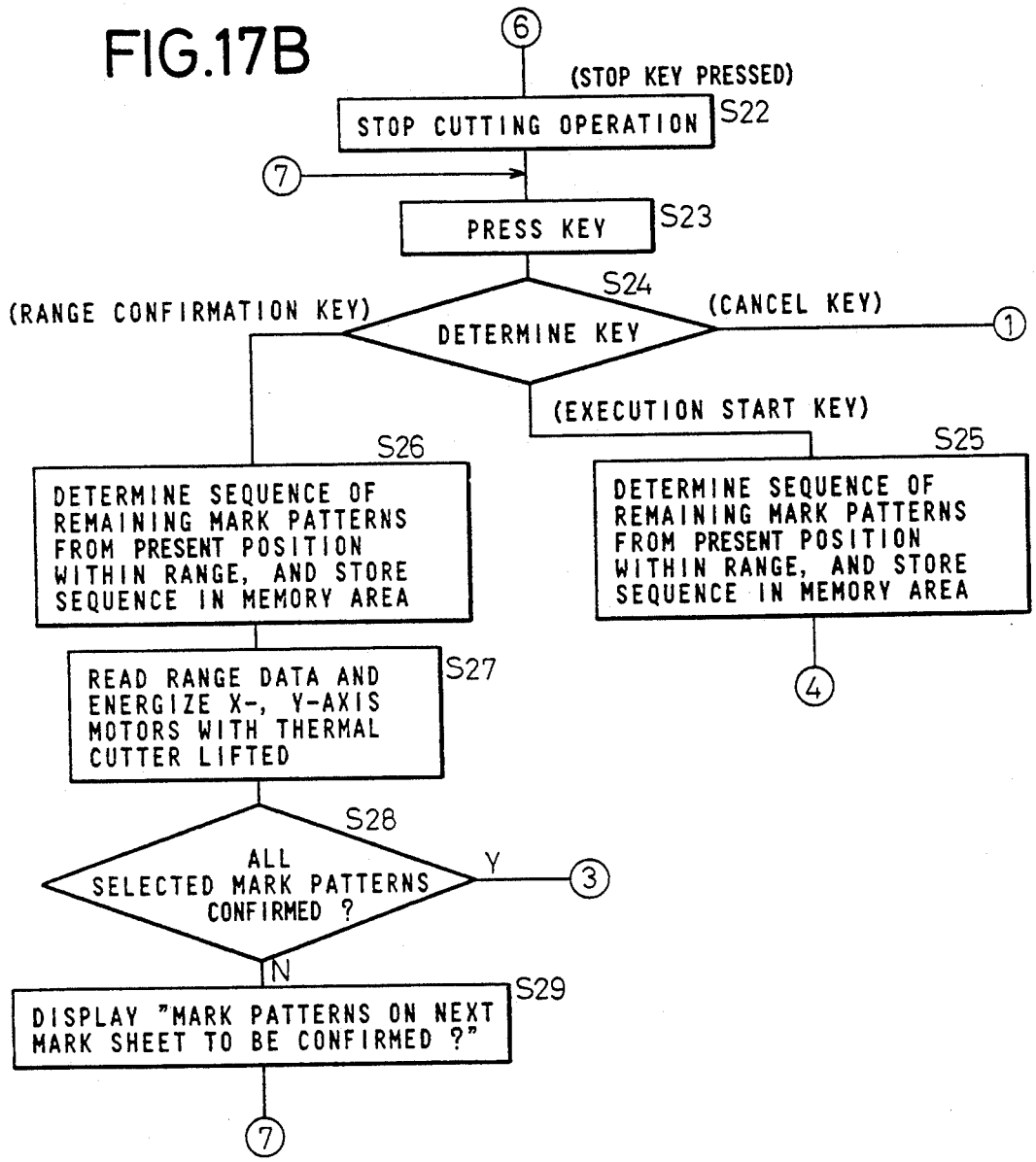

The control sequence shown in FIGS. 17A and 17B include steps S1 through S20 which are identical to those shown in FIG. 11.

If all the mark patterns are not yet cut out of the mark sheet on the glass base 20 in the step S14, then control jumps to a step S21 which determines whether the stop key 196 is pressed or not.

If the stop key 196 is not pressed, then control goes from the step S21 back to the step S12 for continuously cutting the remaining mark patterns out of the mark sheet.

If the stop key 196 is pressed, then control jumps from the step S21 to a step S22 in which the cutting operation is stopped.

Then, a key is pressed in a next step S23, and is determined in a step S24.

If the execution start key 188 is pressed in the step S24, then control goes to a step S25. In the step S25, a sequence of the remaining selected mark patterns, from the present position (Xn, Yn) of the thermal cutter 30, within the preset range is determined using the profile data of the remaining mark pattern data, and stored in the area 146b of the RAM 146. Thereafter, control proceeds from the step S25 to the step S12 to resume the cutting operation.

If the range confirmation key 194 is determined in the step S24, then control goes from the step S24 to a step S26. As with the step S25, a sequence of the remaining selected mark patterns, from the present position (Xn, Yn) of the thermal cutter 30, within the preset range is determined using the profile data of the remaining mark pattern data, and is stored in the area 146b of the RAM 146 in the step S26.

The step S26 is followed by a step S27. In the step S27, using the profile data G of the remaining selected mark pattern data, remaining range data are read from the area 146a of the RAM 146. With the cutting bit 32 lifted off the mark sheet, the thermal cutter 30 is moved by the motors 66, 76 based on the range data to enable the cutting bit 32 to trace the remaining range from which the mark patterns are to be cut out.

A next step S28 determines whether all the selected mark patterns in the mark sheet have been confirmed or not. If confirmed, then control goes back to the step S10 which waits for the depression of a key.

If all the selected mark patterns have not been confirmed yet, then a message "MARK PATTERNS ON NEXT MARK SHEET TO BE CONFIRMED?" is displayed in a step S29. Then, control goes back to the step S23 to wait for the depression of a key.

If the cancel key 190 is determined in the step S24, then control returns to the step S2 for the selection of desired mark patterns to be cut out of a mark sheet.

As described above, the first control process allows desired mark patterns to be selected and cut out of a mark sheet irrespective of the size of the mark sheet. When some of the selected mark patterns have already used up one mark sheet, the remaining selected mark patterns can be cut out of another mark sheet or sheets simply by replacing the previous mark sheet with the additional mark sheet or sheets.

The range from which desired mark patterns are to be cut out can be confirmed on not only the mark sheet mounted on the glass base of the mark cutting apparatus, but also on additional mark sheet or sheets that are to replace the mark sheet on the glass base.

Since the variable range from which desired mark patterns are to be cut out can be set on the mark sheet as desired, it is possible to select margins on the mark sheet for determining positions in which to cut out the mark patterns, thereby effectively utilizing the space on the mark sheet.

A second process of controlling the mark cutting apparatus will be described below with reference to FIGS. 18 through 24. According to the second control process, mark patterns to be cut out of a mark sheet represent numerals (hereinafter referred to as "mark numerals"), ranging from "0" to "9" which may be used singly or in combination to indicate desired numbers. The second control process allows desired desired mark numerals to be entered with fewer number of key strokes for ten numeric keys, and in a shorter period of time, and also displays the counts of mark numerals to be cut out, in a rearranged sequence, for the operator.

Figure 18:
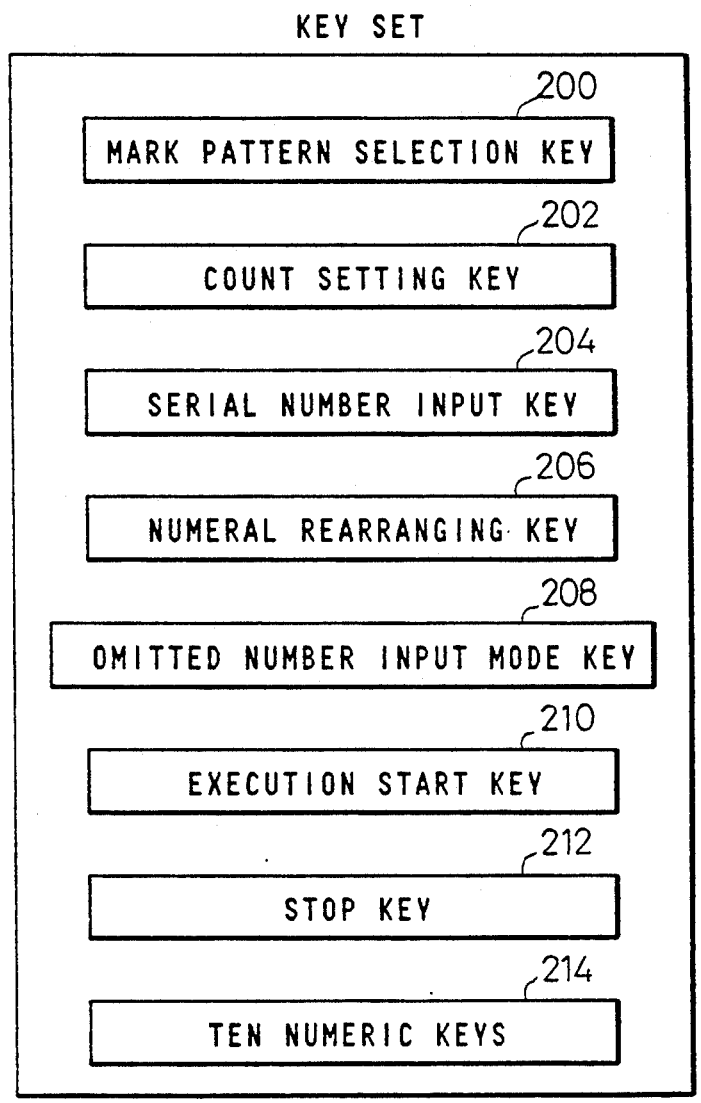
FIG. 18 is a block diagram showing keys used in a key set of the electric control system, for a second control process according to the present invention.

FIG. 18 shows a plurality of keys employed in the key set 24 (shown in FIGS. 1 and 9) for the second control process shown in FIGS. 19 through 24. The keys include a mark pattern selection key 200 for selecting desired mark numerals, one at a time, from the data of a plurality of mark numerals that are stored in the ROM 144 or the floppy disk (FD) 160. A count setting key 202, when pressed, sets the number of mark numerals to be cut out of a mark sheet. A serial number input key 204 serves to enter a series of successive numbers to be represented by mark numerals. A numeral rearranging key 206, when pressed, rearranges entered mark numerals in a successive sequence. An omitted number input key 208, when pressed, enters any undesired numbers to be omitted from the series of successive numbers that have been entered using the serial number input mode key 204. An execution start key 210 is used to instruct the CPU 142 to start operating the mark cutting apparatus to cut desired mark numerals out of a mark sheet. A stop key 212 is used to stop the operation of the mark cutting apparatus. Ten numeric keys 214 are used to enter mark numerals that are desired to be cut out and other numerical values.

The above various operations of the keys are controlled by the control program that is stored in the ROM 144 shown in FIG. 9.

The RAM 146 shown in FIG. 9 includes an area 146a for storing the numeral data of desired mark numerals that have been selected by the mark pattern selection key 200 and read from the ROM 144 or the FD 160.

The RAM 146 also has another area 146b for storing a sequence of mark numerals. The RAM area 146b stores selected mark numerals, the total count of the selected numerals, and the respective counts of the selected mark numerals.

The EEPROM 148 shown in FIG. 9 stores a range that can be established on a mark sheet on the glass base 20 and from which desired mark numerals are to be cut out.

The area 146b of the RAM 146 comprises a memory area buf (FIG. 21) for temporarily storing the counts of mark numerals ranging from "0" to "9" when they are entered using the mark pattern selection key 200 and the count setting key 202. The memory area buf is of a one-dimensional configuration with a linear array of storage locations indicated by subscripts. The counts of the mark numerals are displayed on the display unit 26.

The area 146b of the RAM 146 also comprises a memory area edbuf (FIG. 22) for temporarily storing numbers that are independently entered using the ten numeric keys 214, and mark numerals that are entered using the serial number input key 204, the ten numeric keys 214, etc. The memory area edbuf is of a two-dimensional configuration with a matrix of subscripted storage locations in 15 columns and 8 rows (15×8) corresponding to the display matrix of the display unit 26.

The area 146b of the RAM 146 further comprises a memory area ednbuf (FIG. 23) for temporarily storing the counts of mark numerals that are entered using the mark pattern selection key 200 and the count setting key 202. The memory area ednbuf is also of a two-dimensional configuration with a matrix of subscripted storage locations in 15 columns and 8 rows (15×8) corresponding to the display matrix of the display unit 26.

The second control process will now be described in greater detail with reference to FIGS. 19 through 24.

Figure 19:
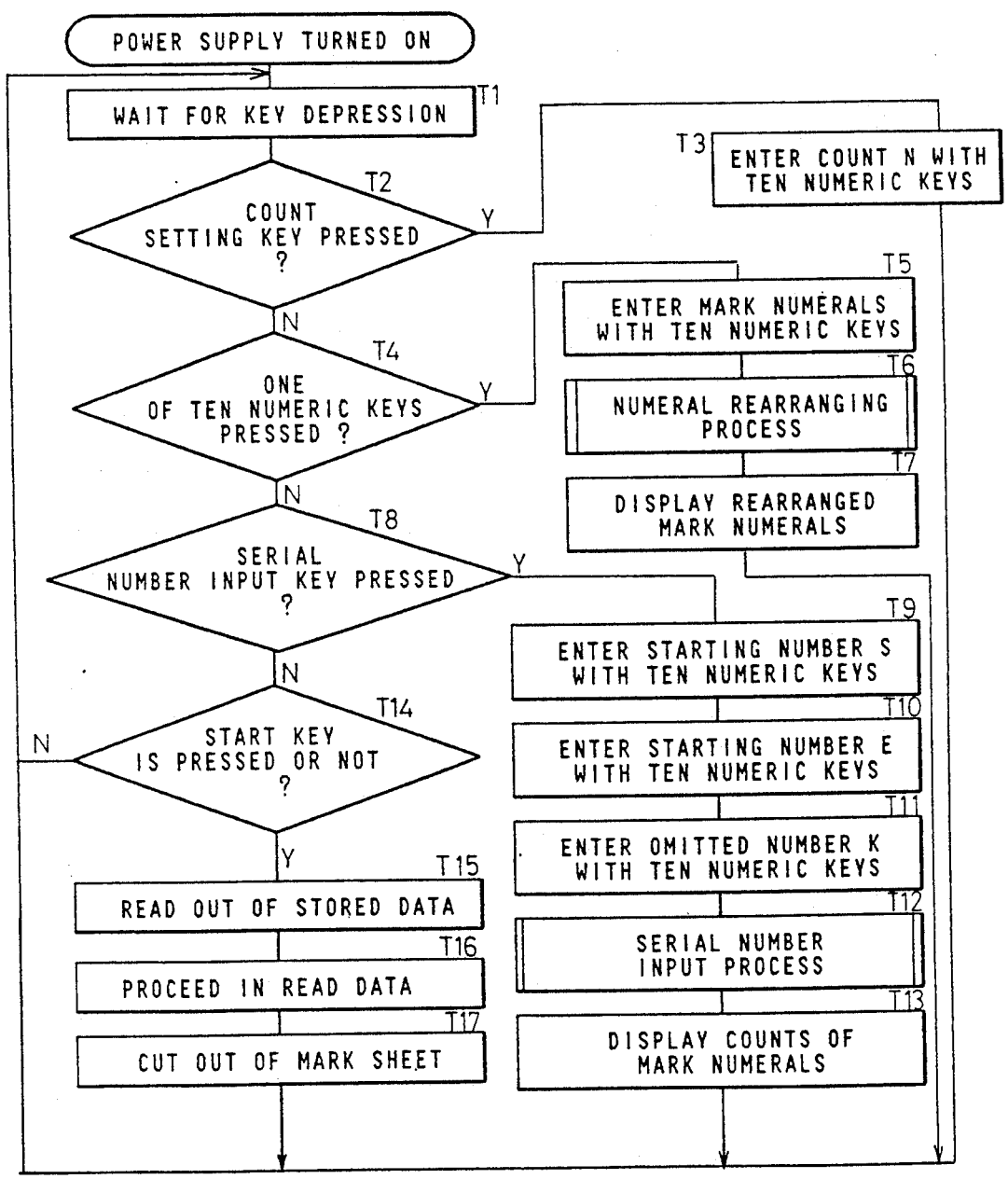
FIG. 19 is a flowchart of the second control process.

When the power supply of the apparatus is turned on, the CPU 142 waits for the depression of a key in a step T1 (FIG. 19).

If the count setting key 202 is pressed in a step T2, then control goes to a step T3. In the step T3, a count N, ranging from "1" to "99", of mark numerals to be cut out of a mark sheet is entered using ten numeric keys 214, and stored. The count N represents the number of mark numerals which will subsequently be selected.

If the count setting key 202 is not pressed in the step T2, but one of the ten numeric keys 214 is pressed in a step T4, then control goes to a step T5. In the step T5, a first mark numeral is selected and entered which is represented by the pressed one of the ten numeric keys 214. Successive mark numerals can also be selected and entered using the ten numeric keys 214 in the step T5.

When the numeral rearranging key 206 is pressed, a numeral rearranging process is effected, in a step T6, to rearrange the counts for respective mark numerals that are selected. The numeral rearranging process will be described later on.

After the step T6, the counts for respective selected mark numerals are displayed on the display unit 26 in a step T7.

If the ten numeric keys T4 are not pressed in the step T4, but the serial number input key 204 is pressed in a step T8, then control goes to a step T9. In the step T9, a starting number S, which may be a one-digit number or a two-digit number, of a series of numbers is entered and stored using the ten numeric keys 214. Thereafter, an ending number E, which may be a one-digit number or a two-digit number, of a series of numbers is entered and stored using the ten numeric keys 214 in a step T10. If there is an undesired number (K1, K2, ..., Ki, ...) to be omitted from the series of numbers that have been entered in the steps T9 and T10, then it is entered and stored in the range from the starting number S to the ending number E, using the ten numeric keys 214.

A serial number input process is effected in a step T12 using the count N stored in the step T3, the starting number S stored in the step T9, the ending number E stored in the step T10, and the omitted number K stored in the step T11. The serial number input process will be described later on.

The counts of the respective mark numerals after the serial number input process are displayed on the display unit 26 in a step T13.

If the serial number input key 204 is not pressed in the step T8, then a step T14 determines whether the execution start key 210 is pressed or not. If the execution start key 210 is not pressed, then control returns to the step T1. If the execution start key 210 is pressed, then control proceeds to a step T15 in which the numeral data of the selected mark numerals are read from the ROM 144 or the FD 160. The read numeral data are processed in a step T16, and the mark numerals are cut out of the mark sheet on the glass base 20 by the thermal cutter 30 based on the read numeral data in a step T17.

After the mark numerals have been cut out of the mark sheet, control goes back to the step T1 to wait for the depression of a key.

Figure 20:
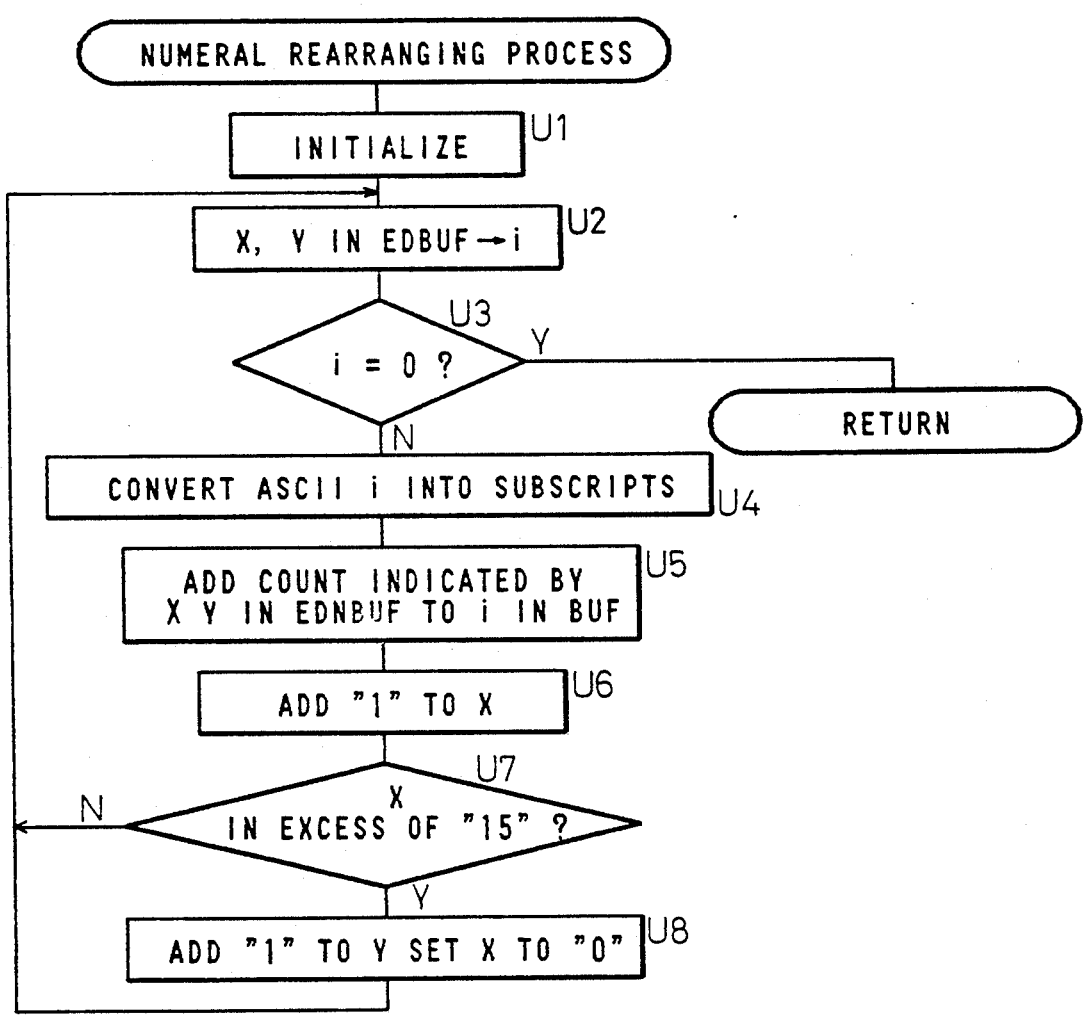
FIG. 20 is a flowchart of a subroutine of the second control process.

The numeral rearranging process in the step T6 will be described below with reference to FIG. 20.

The memory areas edbuf, ednbuf are first initialized to set the subscripts X, Y to "0" in a step U1.

Then, the subscripts X, Y of the memory area edbuf are set to a variable "i" in a step U2.

A next step U3 determines whether the variable "i" is "0" or not If the variable "i" is "0" then the numeral rearranging process is ended, and control goes back to the step T7 shown in FIG. 19. If the variable "i" is not "0" then control proceeds to a step U4.

In the step U4, the value of "i" that is expressed according to ASCII is converted into subscripts.

Using the converted variable "i" the count stored in the memory area ednbuf at the memory location indicated by the subscripts X, Y is added to the value in the memory location "i" in the memory area buf in a step U5.

Then, "1" is added to the subscript "X" in order to read a next column in a step U6.

A next step U7 determines whether the subscript "X" exceeds "15" or not. If yes, then control goes to a step U8, and if not, then control goes back to the step U2.

In the step U8, "1" is added to the subscript "Y" in order to read a next row, and the subscript "X" is set to "0". Thereafter, control goes back to the step U2.

The serial number input process will be described below with reference to FIG. 24.

Steps V1 through V7 of the serial number input process total the mark numerals to be cut out of the mark sheet. Specifically, these steps divide numbers, which have been entered, into mark numerals ranging from "0" to "9", arrange the mark numerals in order from "0" to "9", and total the mark numerals of same kinds.

If there are any numbers that have already been entered, they are rearranged in the memory area buf in a step V1. Then, a step V2 compares starting and ending numbers S, E with each other. If the starting number S exceeds the ending number E, then control goes to a step V8, and if the starting number X does not exceed the ending number E, then control goes to a step V3.

The step V3 compares the starting number S with "10". If the starting number S is smaller than "10" then a step V4 adds the preset count N to the starting number S in the memory area buf. Thereafter, "1" is added to the starting number S, and the sum is used as a starting number in a step V5. From the step V5, control goes back to the step V2. If the starting number S is larger than "10" in the step V3, then the starting number S is divided by "10" to determine a quotient Q and a remainder R in a step V6. The step V6 is followed by a step V7 in which the preset count N is added to each of the quotient Q and the remainder R that are stored in the memory area buf. Control goes from the step V7 to the step V5. The above loop is repeated until the starting number S exceeds the ending number E in the step V2.

Steps V8 through steps V12 subtract the counts of omitted numbers from the counts of the numbers that have been totalled in the steps V1 through V7.

The step V8 determines whether an omitted number Ki has been registered. If registered, then control goes to a step V9, and if not the serial number input process is finished and control returns to the step T13 of the main routine shown in FIG. 19.

The step V9 compares the omitted number Ki with "10". If the omitted number Ki is smaller than "10" then the count N is deducted from a preset number K in the memory area buf, and thereafter control returns to the step V8. If the omitted number Ki is larger than "10" in the step V9, then the omitted number is divided by "10" to determine a quotient Q and a remainder R in a step V11. The step V11 is followed by a step V12 in which the preset count N is deducted from each of the quotient Q and the remainder R that are stored in the memory area buf. Thereafter, control goes from the step V12 to the step V8.

According to the second process as described above, when desired mark numerals are to be cut out of a mark sheet or sheets on the mark cutting apparatus, the desired mark numerals can be entered with a fewer number of key strokes for the ten numeric keys 214 and in a shorter period of time, and the counts of the entered mark numerals are displayed on the display unit 26 in a rearranged sequence, for the operator. Therefore, the operator can visually check the entered mark numerals and their counts. The second process also provides quick basic data for an efficient process of cutting desired mark numerals out of a mark sheet or sheets without a wasteful consumption of mark sheets.

A process of cleaning the cutting bit 32 of the thermal cutter 30 will be described below with reference to FIGS. 25 through 28.

Figure 25:
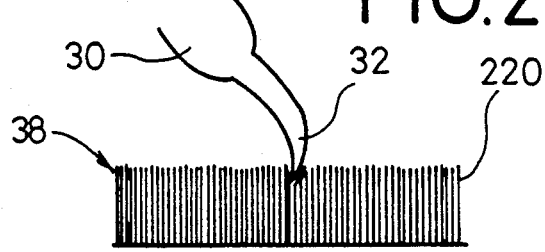
FIG. 25 is an enlarged side elevational view showing the manner in which the cutting bit of the thermal cutter is cleaned by a cutter cleaner of the mark cutting apparatus.

FIG. 25 shows the manner in which the cutting bit 32 is cleaned by the cutter cleaner 38. The cutter cleaner 38 comprises a metal brush 220 for cleaning the cutting bit 32 in frictional contact therewith. In operation, the cutting bit 32 is lowered into contact with the metal brush 220, and moved along a certain pattern within a given range in the metal brush 220 to remove deposits which have been attached to the cutting bit 32 during cutting operation of the thermal cutter 30.

Figure 26:
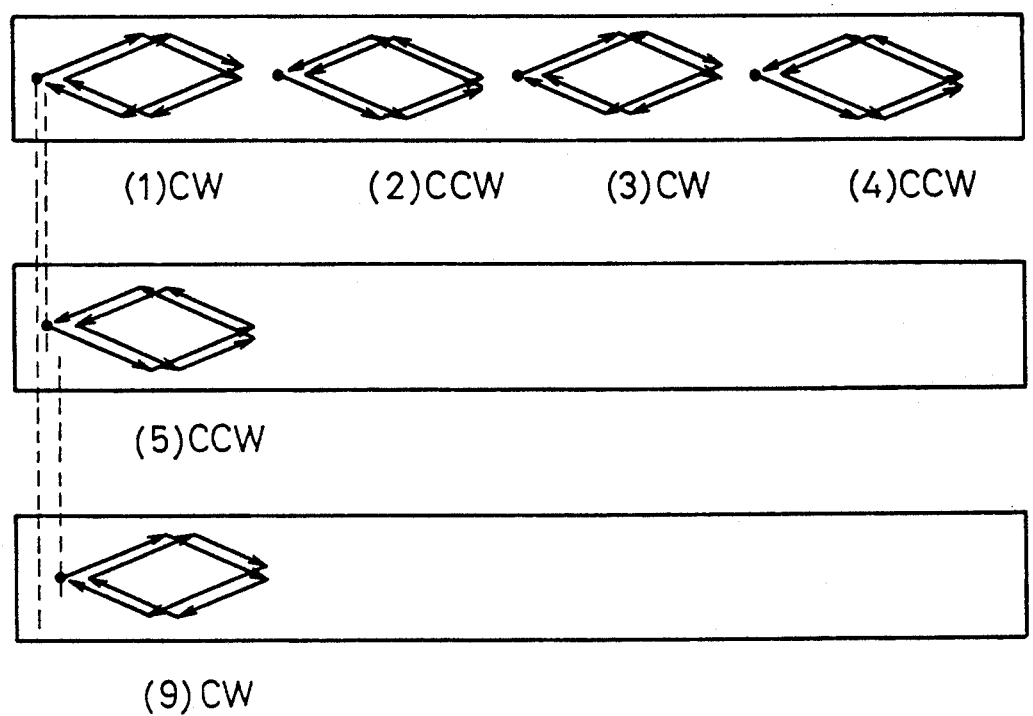
FIG. 26 is a diagram illustrative of patterns and ranges in which the cutting bit can be cleaned by the thermal cutter.

As shown in FIG. 26, when the thermal cutter 30 is cleaned in a first cleaning cycle (1), it is moved clockwise in contact with the metal brush 220 according to a predetermined lozenge-shaped pattern within a first range in the metal brush 220. After the first cleaning cycle, the thermal cutter 30 is actuated to cut marks out of a mark sheet. When it is determined that the thermal cutter 30 has moved a predetermined distance, cutting out marks, the thermal cutter 30 is cleaned again in a second cleaning cycle (2). In the second cleaning cycle, the thermal cutter 30 is moved counterclockwise in a range different from the range in the first cleaning cycle. The thermal cutter 30 is cleaned according to clockwise and counterclockwise patterns in different ranges in respective third and fourth cleaning cycles (3), (4). In a fifth cleaning cycle (5), the thermal cutter 30 is moved counterclockwise in a range that is slightly displaced rightward from the range in the first cleaning cycle. In a ninth cleaning cycle (9), the thermal cutter 30 is moved clockwise in a range that is slightly displaced rightward from the range in the fifth cleaning cycle. Since the cutting bit 32 is cleaned in alternately opposite directions, it is prevented from unduly localized wear in contact with the metal brush 220. Furthermore, since the cutting bit 32 is cleaned by different portions of the metal brush 220 in respective cleaning cycles, the metal brush 220 is also protected from unduly localized wear.

For the cleaning operation, the EEPROM 148 of the electric control system 140 shown in FIG. 9 stores patterns and ranges in which the thermal cutter 30 is to be cleaned by the cutter cleaner 38.

The cleaning process will now be described with reference to FIGS. 27 and 28.

Figure 27:
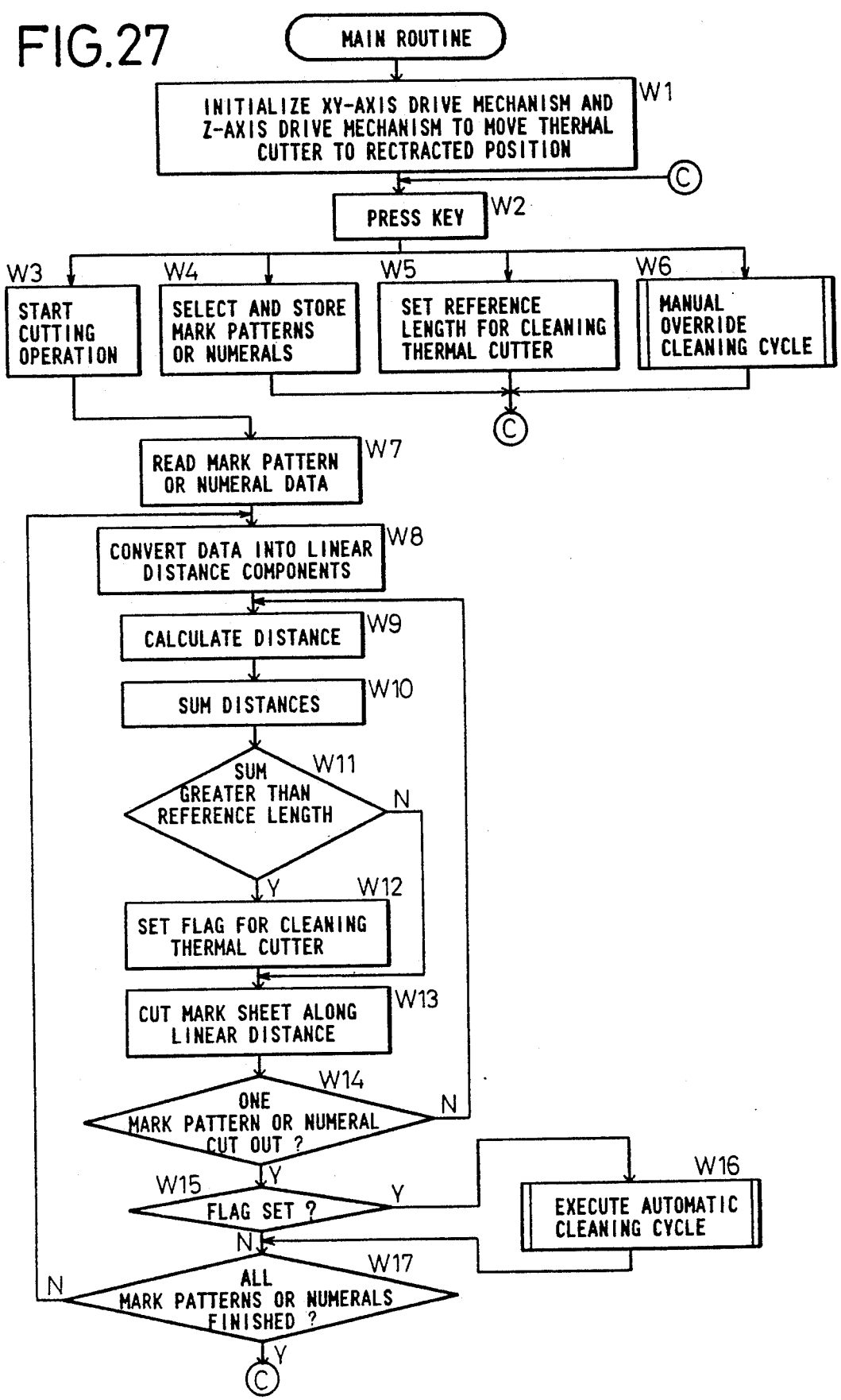
FIG. 27 is a flowchart of an operation sequence for cleaning the cutting bit.
Figure 28:
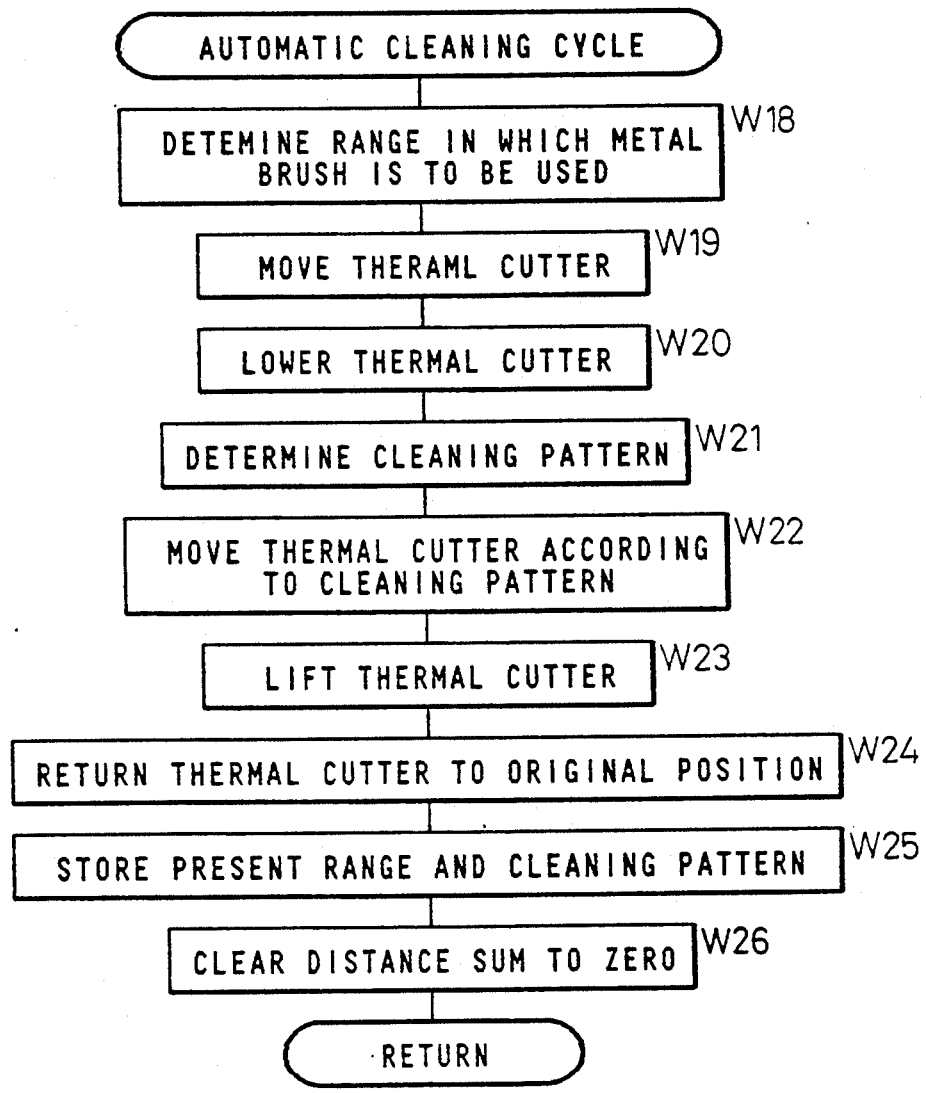
FIG. 28 is a flowchart of a subroutine of the operation sequence shown in FIG. 27.

As shown in FIG. 27, when the power supply of the apparatus is turned on, the XY-axis drive mechanism 162 and the Z-axis drive mechanism 164 are initialized to move the thermal cutter 30 to a retracted position outside the glass base 20 in a step W1. Then, key strokes are waited for in a step W2.

Mark patterns or numerals are selected and stored in a step W4. The thermal cutter 30 is cleaned each time it has traveled a certain reference length, cutting mark patterns out of a mark sheet. The reference length, which varies with types of mark sheets, is established by entering the type of a mark sheet used in a step W5. Instead, the numerical value of the reference length may actually be entered using the ten numeric keys of the key set 24. A step W6 effects a manual override cleaning cycle for allowing the user to enter a key stroke to start cleaning the thermal cutter 30 with the cutter cleaner 38 irrespective of whether the thermal cutter 30 is cutting a mark out of a mark sheet or not.

After the desired mark patterns or numerals have been selected and stored and also the reference length for cleaning the thermal cutter 30 has been established, the execution start key is pressed to cause the thermal cutter 30 to cut the mark patterns or numerals out of the mark sheet in a step W3.

The data of the selected mark patterns or numerals are read from the ROM 144 or the FD 160 and stored in the RAM 146 in a step S7. The data of one mark pattern or numeral, which is composed of linear and arcuate components, is converted into linear distance components ($\Delta X$, $\Delta Y$) along the directions X, Y, which are stored in a memory area of the RAM 146 in a step W8. In a next step W9, the linear interval data are successively read from the RAM 146, and a linear length or distance L that the thermal cutter 30 is to travel is calculated according to the equation:

$$L = \sqrt{\Delta X^2 + \Delta Y^2}$$

A step W10 sums distances determined in the past in the step W9, thus determining the total length or distance by which the thermal cutter 30 has cut off the mark sheet or sheets thus far.

Then, a step W11 compares the total distance with a preset reference length. If the total distance is longer than the preset reference length, then a recognition flag indicating that the thermal cutter 30 should be cleaned is set in a step W12. If the total distance is shorter than the preset reference length, then the thermal cutter 30 is allowed, in a step W13, to cut off the mark sheet along the linear distance L determined in the step W9. The steps W9 through W13 are repeated until one mark pattern or numeral is cut out of the mark sheet as determined in a step W14. When one mark pattern or numeral has been cut out, a step W15 checks the recognition flag. If the recognition flag has been set, then an automatic cleaning cycle is executed in a step W16. The steps W8 through W16 are repeated until all the selected mark patterns or numerals are cut out as determined in a step W17.

The cleaning cycle W16 will be described below with reference to the subroutine shown in FIG. 28.

First, a step W18 determines a range in which the metal brush 220 is to be used to clean the thermal cutter 30, based on the range data stored in the EEPROM 148 (FIG. 9). The thermal cutter 30 is then moved to the determined range in a step W19. In a step W20, the thermal cutter 30 is lowered to put the cutting bit 32 into contact with the metal brush 220 (see FIG. 25). A lozenge-shaped cleaning pattern, along which the thermal cutter 30 is to be moved in the metal brush 220, is determined based on the pattern data stored in the EEPROM 148 in a step W21. The thermal cutter 30 is then moved according to the determined cleaning pattern as shown in FIG. 26, in a step W22, so that it is cleaned to remove any deposits that may have been attached to the cutting bit 32 during the cutting process. Then, the thermal cutter 30 is lifted in a step W23, and moved back to the original position in a step W24. The range in which the thermal cutter 30 is moved and the cleaning pattern along which it is moved in the cleaning cycle are stored in the EEPROM 148 in a step W25. Thereafter, the sum distance which has been calculated in the step W10 is cleared to zero in a step W26.

The cleaning process as described above is advantageous in that, since the thermal cutter 30 can be cleaned even while selected mark patterns or numerals are being successively cut out thereby, the thermal cutter 30 can cut off the mark sheet or sheets without smearing the same.

The reference length for cleaning the thermal cutter 30 is determined depending on the type of the mark sheet or sheets used. Therefore, the thermal cutter 30 may be cleaned at least frequent intervals, and will not be cleaned in unnecessary cleaning cycles. The overall cutting operation is thus rendered highly efficient.

Since the thermal cutter 30 is cleaned according a different cleaning pattern in a different range in the metal brush 220 in each cleaning cycle, the thermal cutter 30 will not be smeared with previously removed deposits and will be uniformly worn by the metal brush 220, and the metal brush 220 will also be uniformly worn by the thermal cutter 30. Accordingly, the thermal cutter 30 and the metal brush 220 have a longer service life. As the previous cleaning patterns and ranges are stored in the EEPROM 148, the thermal cutter 30 can be cleaned according to a new cleaning pattern in a new range even when the apparatus is restarted after a shutdown.

Figure 29:
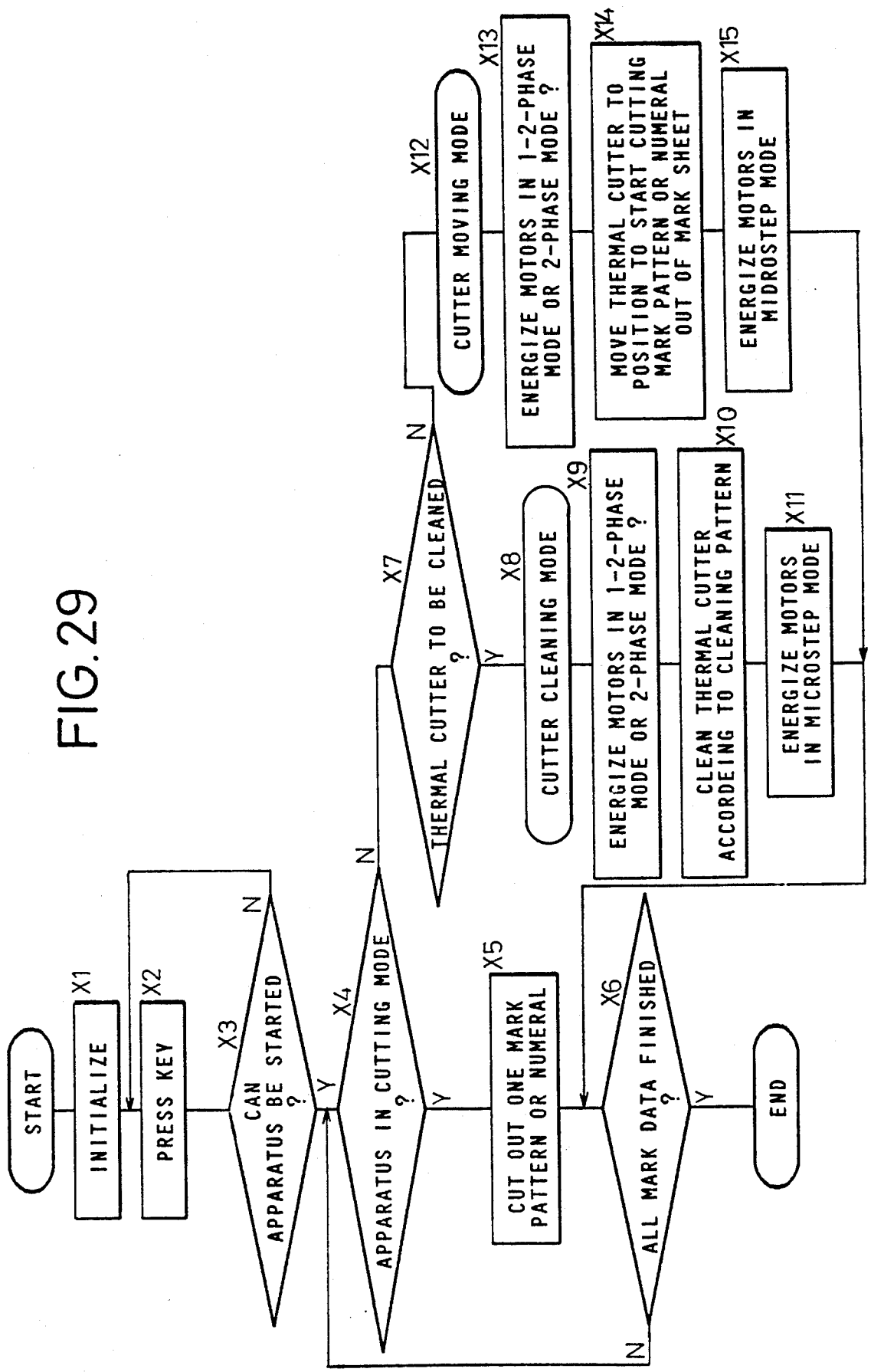
FIG. 29 is a flowchart of an operation sequence for energizing motors at different speeds in different modes.

FIG. 29 shows a process of energizing the motors 66, 76, 112 at different speeds in different modes.

In FIG. 29, when the power supply of the apparatus is turned on, the apparatus is initialized, and the motors 66, 76, 112 are ready to be energized in a microstep mode in a step X1.

Key strokes are waited for in a step X2. The operator may enter data relative to desired mark patterns or numerals to be cut out of a mark sheet, or instruct the apparatus to enter a cutter cleaning mode or cutter moving mode in a step X2. In the cutter cleaning mode, the thermal cutter 30 is cleaned by the cutter cleaner 38 in the process described above with reference to FIGS. 26 through 28. In the cutter moving mode, the thermal cutter 30 is moved to a position where it starts to cut out desired mark patterns or numerals.

If mark pattern or numeral data are entered, or the cutter cleaning mode or cutter moving mode is instructed in the step X2 as determined in a step X3, then the apparatus starts operating. If not, then control goes back from the step X3 to the step X2 to wait for key strokes.

A step X4 determines whether the apparatus is in a mode to cut out desired mark patterns or numerals. If it is, then the apparatus cuts one of the desired mark patterns or numerals out of a mark sheet in a step X5. Then, a step X6 determines whether all the mark patterns or numerals have been cut out, i.e., whether all the mark pattern or numeral data have been finished. If all of the mark pattern or numeral data have not been finished, then control returns from the step X6 to the step X4, and the remaining mark patterns or numerals are cut out of the mark sheet. If all the mark pattern or numeral data have been finished in the step X6, then the process is ended.

If the apparatus is not in the mode to cut out desired mark patterns or numerals in the step X4, then control goes from the step X4 to a step X7 which determines whether the thermal cutter 30 is to be cleaned or not. If the thermal cutter 30 is to be cleaned, then the apparatus enters the cutter cleaning mode in a step X8.

The motors 66, 76, 112, which have been energized in the microstep mode, are now energized in a 1-2-phase mode or a 2-phase mode in a step X9. Then, while the thermal cutter 30 is being moved by the motors 66, 76, 112, it is cleaned by the cutter cleaner 38 according to a selected pattern in a selected range in a step X10.

After the thermal cutter 30 has been cleaned in the step X10, the motors 66, 76, 112 are energized again in the microstep mode in a step X11, which is followed by the step X6.

If the thermal cutter 30 is not to be cleaned in the step X7, then the apparatus enters the cutter moving mode in a step X12. The motors 66, 76, 112, which have been energized in the microstep mode, are now energized in the 1-2-phase mode or the 2-phase mode in a step X13. Then, the thermal cutter 30 is moved by the motors 66, 76, 112 to a position where it starts to cut out desired mark patterns or numerals, based on the data of the selected mark patterns or numerals.

After the thermal cutter 30 has been moved in the step X14, the motors 66, 76, 112 are energized again in the microstep mode in a step X15. Thereafter, control goes to the step X6.

Figure 30:
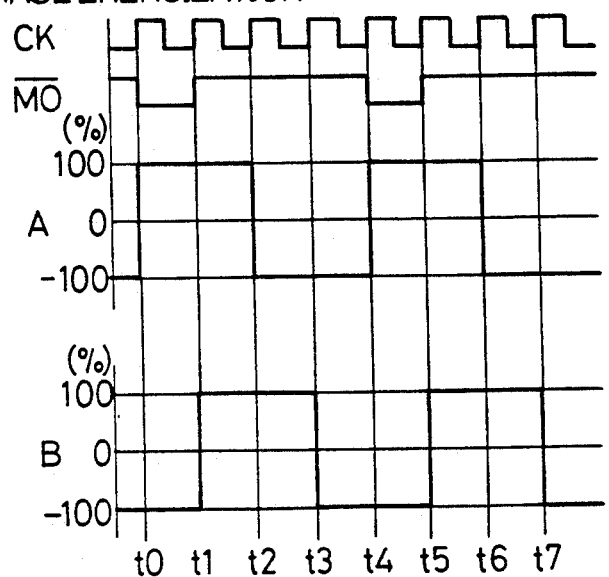
FIG. 30 is a diagram showing a pattern of 2-phase energization of the motors.

FIG. 30 shows a pattern of 2-phase energization of the motors 66, 76, 112. In FIG. 30, CK indicates clock pulses, and MO indicates periods (one period ranging from t0 to t4). The motors are energized in two phases A, B each having an energy pattern ranging from 100% to −100%. The energy, which may be represented by a voltage or a current, is applied in one level above or below the level zero.

Figure 31:
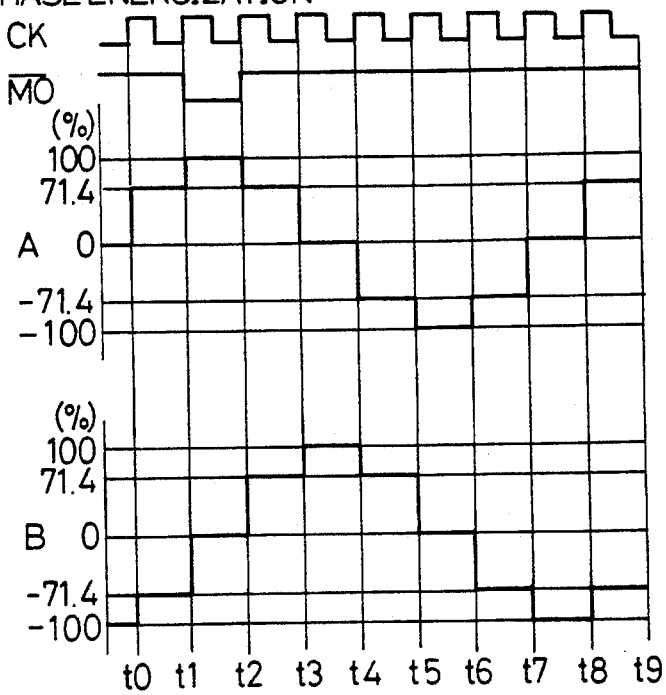
FIG. 31 is a diagram showing a pattern of 1-2-phase energization of the motors.

FIG. 31 shows a pattern of 1-2-phase energization of the motors 66, 76, 112. One period MO, which ranges from t1 to t9, is twice longer than one period of the pattern of 2-phase energization shown in FIG. 30. The energy in each phase A or B is applied in two levels above or below the level zero.

Figure 32:
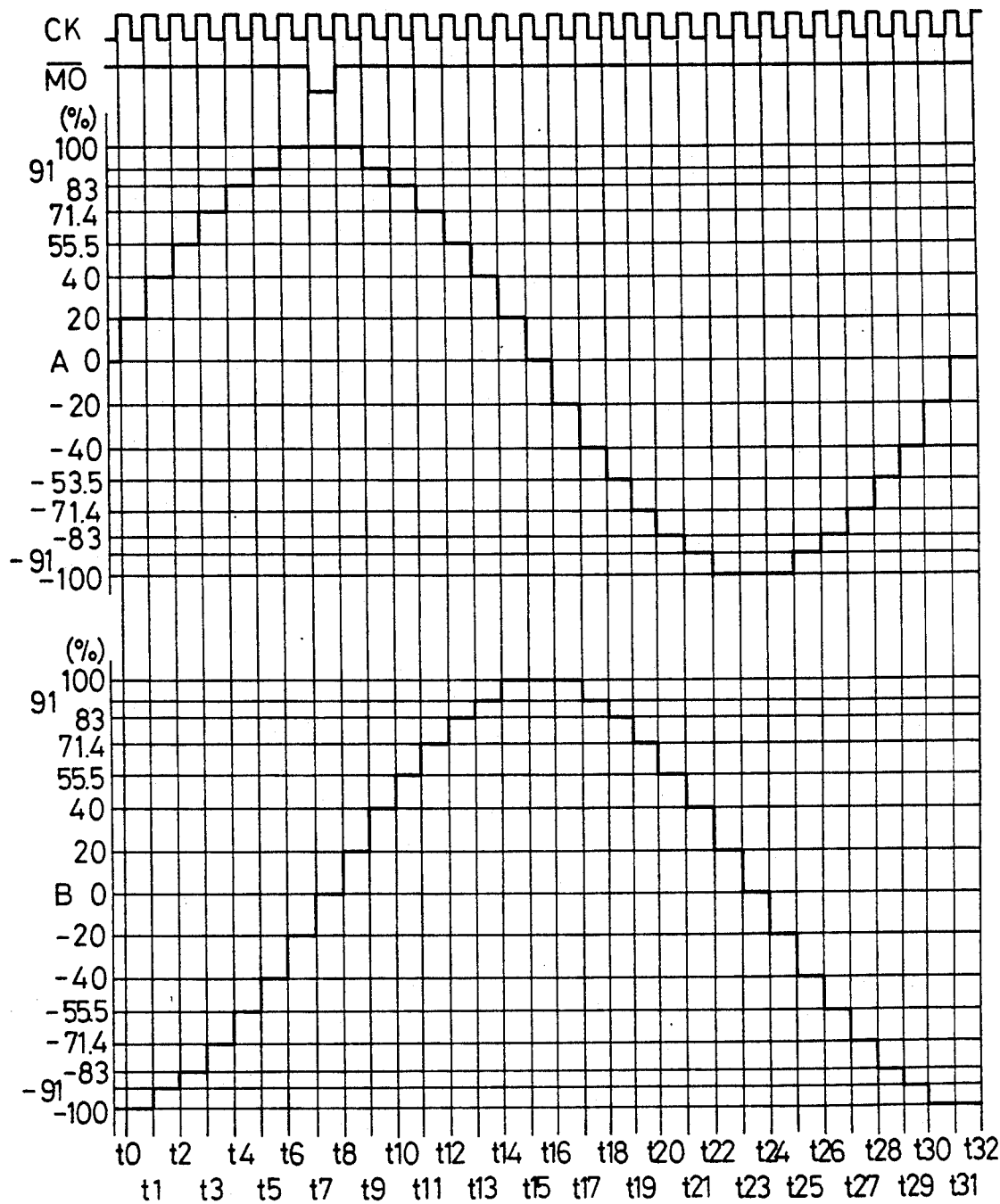
FIG. 32 is a diagram showing a pattern of 2W1-2-phase energization of the motors.

FIG. 32 shows a pattern of 2W1-2-phase energization (microstep mode) of the motors 66, 76, 112. One period MO, which ranges from t7 to t39, is eight times longer than one period of the pattern of 2-phase energization shown in FIG. 30. The energy in each phase A or B is applied in seven levels above or below the level zero.

Therefore, the motors 66, 76, 112 are energized at much shorter periods in the cutter cleaning mode or the cutter moving mode than in the mode in which the thermal cutter 30 cuts out desired mark patterns or numerals. Consequently, the thermal cutter 30 can be cleaned or moved to the position to start cutting out desired mark patterns or numerals, at a higher speed. The entire efficiency of operation of the apparatus is thus increased.

Although certain preferred embodiments of the present invention have been shown and described in detail, it should be understood that various changes and modifications may be made therein without departing from the scope of the appended claims.

What is claimed is:

1. An apparatus for cutting marks out of a mark sheet, comprising:
    a housing having a base for supporting a mark sheet thereon;
    a first carriage movable in a first direction over said base;
    a second carriage supported on said first carriage for movement in a second direction transverse to said first direction;
    a thermal cutter for thermally cutting marks out of the mark sheet supported on said base, said thermal cutter being supported on said second carriage, whereby said thermal cutter can be moved over said base two-dimensionally by said first and second carriages;
    a mechanism mounted on said second carriage for moving said thermal cutter in a third direction transverse to said first and second directions, between an upper position in which said thermal cutter is lifted off the mark sheet supported on said base and a lower position in which said thermal cutter is lowered in contact with the mark sheet supported on said base;
    said mechanism comprising:
        a stepping motor mounted on said second carriage;
        an eccentric shaft rotatably mounted on said second carriage parallel to said second direction, said eccentric shaft being operatively coupled to said stepping motor whereby said eccentric shaft can be rotated by said stepping motor;
        a roller fitted over said eccentric shaft for sliding movement therealong;
        an abutment arm resting on said roller for movement therewith along said eccentric shaft;
        a support arm angularly movably mounted on said second carriage and coupled to said abutment arm; and
        an attachment fixed to said support arm and connected to said thermal cutter; and
    means for energizing said thermal cutter to thermally cut marks out of the mark sheet while said thermal cutter is in said lower position.

2. An apparatus according to claim 1, wherein abutment arm has a pair of fingers sandwiching said roller axially therebetween, whereby said abutment arm can move with said roller along said eccentric shaft.

3. An apparatus according to claim 1, wherein said first carriage has a pair of opposite end walls, said eccentric shaft being supported on and extending between said end walls, said mechanism further comprising a worm wheel mounted on an end of said eccentric shaft which projects from one of said end walls, and a worm mounted on a drive shaft of said stepping motor and held in mesh with said worm wheel.

4. The apparatus according to claim 1, wherein said thermal cutter further comprises:
    a cutter base coupled to said second carriage;
    a heater supported by and extending from said cutter base;
    a cutting bit for contacting the mark sheet supported on said base, said cutting bit being detachably attached to said heater;

biasing means disposed between said cutter and said cutting bit, for normally said cutting bit resiliently away from said cutter base;
a protective pipe covering said cutting bit and said biasing means and connecting said cutting bit to said cutter base, and
means for energizing said thermal cutter to thermally cut marks out of the mark sheet while said thermal cutter is in said lower position.

5. The apparatus according to claim 4, wherein said biasing means comprises a disc spring held against said cutter base, and a spacer disposed between said disk spring and said cutting bit.

6. The apparatus according to claim 4, wherein said biasing means comprises a compression coil spring disposed under compression between said cutter base and said cutting bit.

* * * * *